(12) United States Patent
Baek et al.

(10) Patent No.: US 11,800,526 B2
(45) Date of Patent: Oct. 24, 2023

(54) METHOD AND DEVICE FOR PERFORMING UPLINK STATUS REPORT FOR LOW LATENCY IN NEXT-GENERATION MOBILE COMMUNICATION SYSTEM

(71) Applicant: Samsung Electronics Co., Ltd., Gyeonggi-do (KR)

(72) Inventors: Sangkyu Baek, Gyeonggi-do (KR); Anil Agiwal, Gyeonggi-do (KR)

(73) Assignee: Samsung Electronics Co., Ltd

( * ) Notice: Subject to any disclaimer, the term of this patent is extended or adjusted under 35 U.S.C. 154(b) by 39 days.

(21) Appl. No.: 16/735,135

(22) Filed: Jan. 6, 2020

(65) Prior Publication Data

US 2020/0221490 A1   Jul. 9, 2020

(30) Foreign Application Priority Data

Jan. 4, 2019   (KR) .................. 10-2019-0001290

(51) Int. Cl.
*H04W 72/23* (2023.01)
*H04W 28/02* (2009.01)
(Continued)

(52) U.S. Cl.
CPC ....... *H04W 72/23* (2023.01); *H04W 28/0278* (2013.01); *H04W 72/1268* (2013.01);
(Continued)

(58) Field of Classification Search
CPC . H04W 72/14; H04W 28/0278; H04W 72/10; H04W 72/1242; H04W 72/1268; H04W 72/1289; H04W 80/02
See application file for complete search history.

(56) References Cited

U.S. PATENT DOCUMENTS

2016/0021646 A1   1/2016   Hu et al.
2018/0124802 A1   5/2018   Yi et al.
(Continued)

FOREIGN PATENT DOCUMENTS

WO   WO 2015/046787   4/2015
WO   WO 2016/182345   11/2016

OTHER PUBLICATIONS

3GPP, 5G; 5GS; UE Conformance Specification; Part 1: Protocol (3GPP TS 38.523-1 Version 15.1.0 Release 15), ETSI TS 138 523-1 V15.1.0, Oct. 15, 2018, 768 Pages.
(Continued)

*Primary Examiner* — Dinh Nguyen
(74) *Attorney, Agent, or Firm* — The Farrell Law Firm, P.C.

(57) ABSTRACT

The disclosure relates to a communication method and a system therefor, wherein the method converges Internet of things (IoT) technology and a fifth generation (5G) communication system for supporting a high data transmission rate beyond that of a fourth generation (4G) system, and may be applied to intelligent services based on 5G communication and IoT-related technology. Herein, a method by a terminal includes receiving, from a base station, logical channel configuration information including first information on an allowed configured grant for each of at least one logical channel and second information on a priority for each of the at least one logical channel, identifying that an uplink grant for a first configured grant and an uplink grant for a second configured grant are overlapped, and transmitting, to the base station, the first configured grant having a priority that is higher than a priority of the second configured grant, based on the first information and the second information.

12 Claims, 35 Drawing Sheets

(51) Int. Cl.
*H04W 72/1268* (2023.01)
*H04W 80/02* (2009.01)
*H04W 72/56* (2023.01)
*H04W 72/566* (2023.01)

(52) U.S. Cl.
CPC ......... *H04W 72/56* (2023.01); *H04W 72/569* (2023.01); *H04W 80/02* (2013.01)

(56) References Cited

U.S. PATENT DOCUMENTS

| | | | |
|---|---|---|---|
| 2018/0176937 A1* | 6/2018 | Chen | H04W 74/085 |
| 2018/0310308 A1 | 10/2018 | Loehr et al. | |
| 2018/0368132 A1* | 12/2018 | Babaei | H04L 1/1819 |
| 2020/0305186 A1* | 9/2020 | Alfarhan | H04W 72/14 |

OTHER PUBLICATIONS

International Search Report dated Apr. 17, 2020 issued in counterpart application No. PCT/KR2020/000165, 8 pages.
Indian Examination Report dated Jan. 11, 2023 issued in counterpart application No. 202137029730, 6 pages.

* cited by examiner

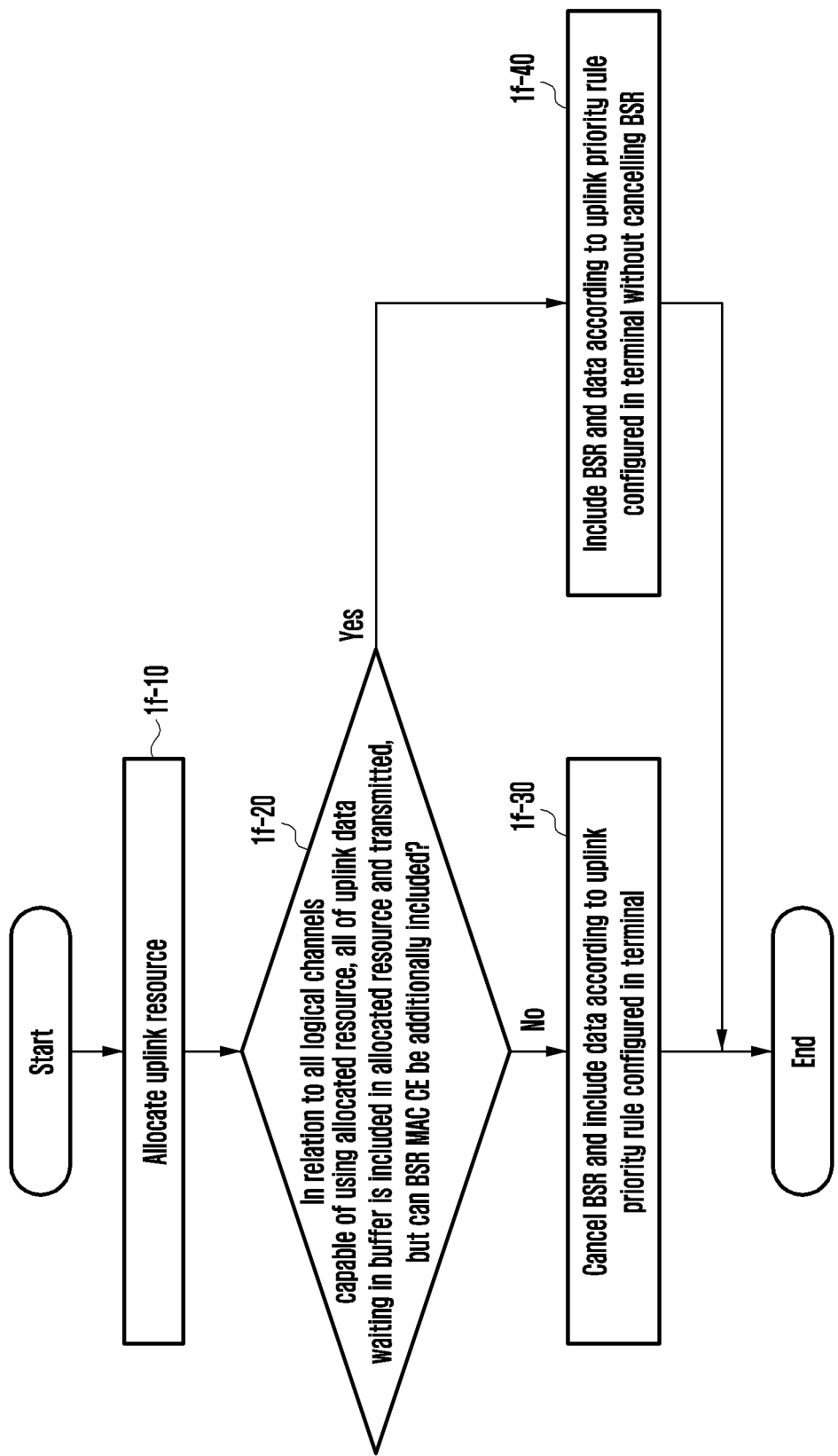

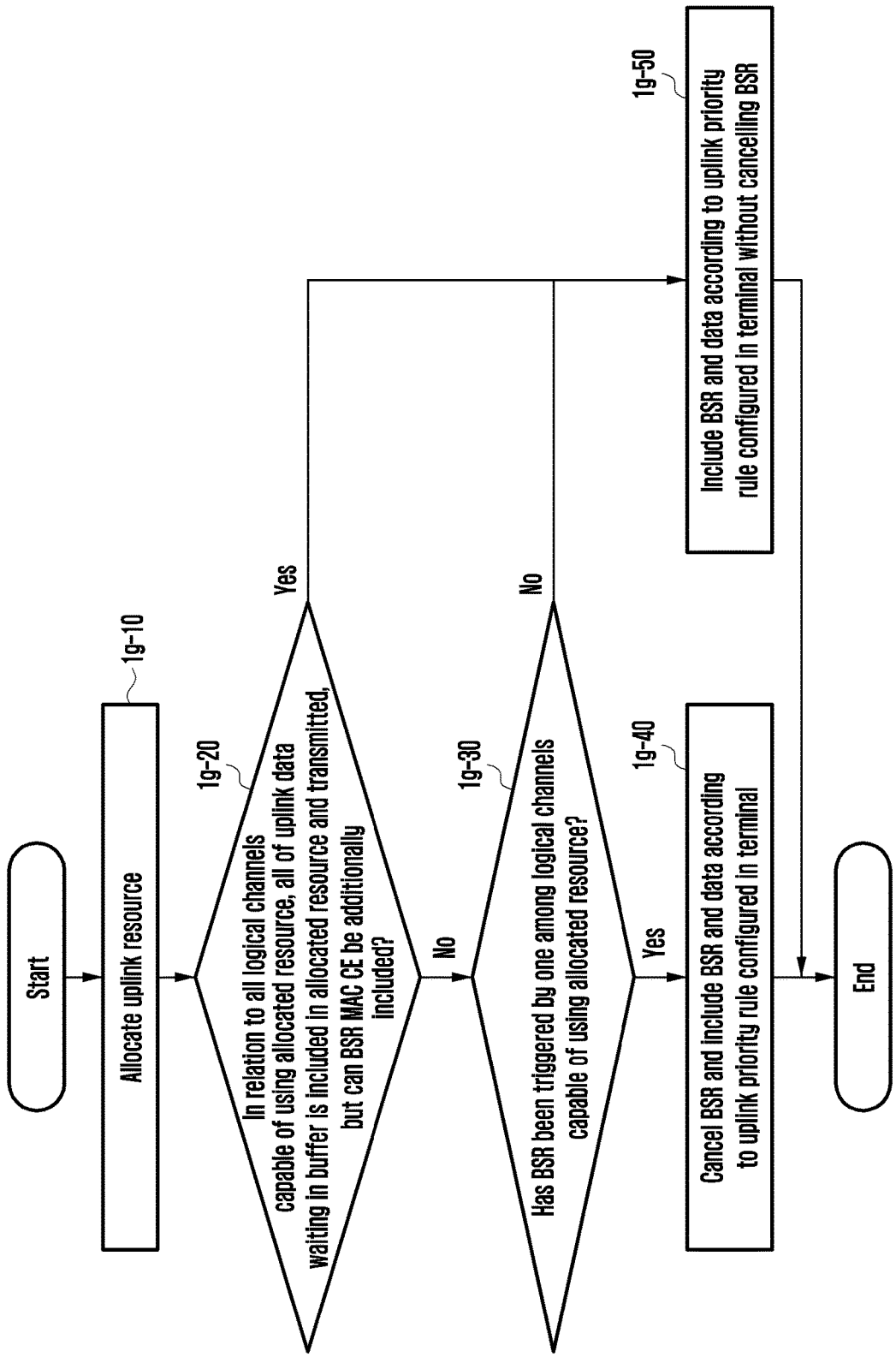

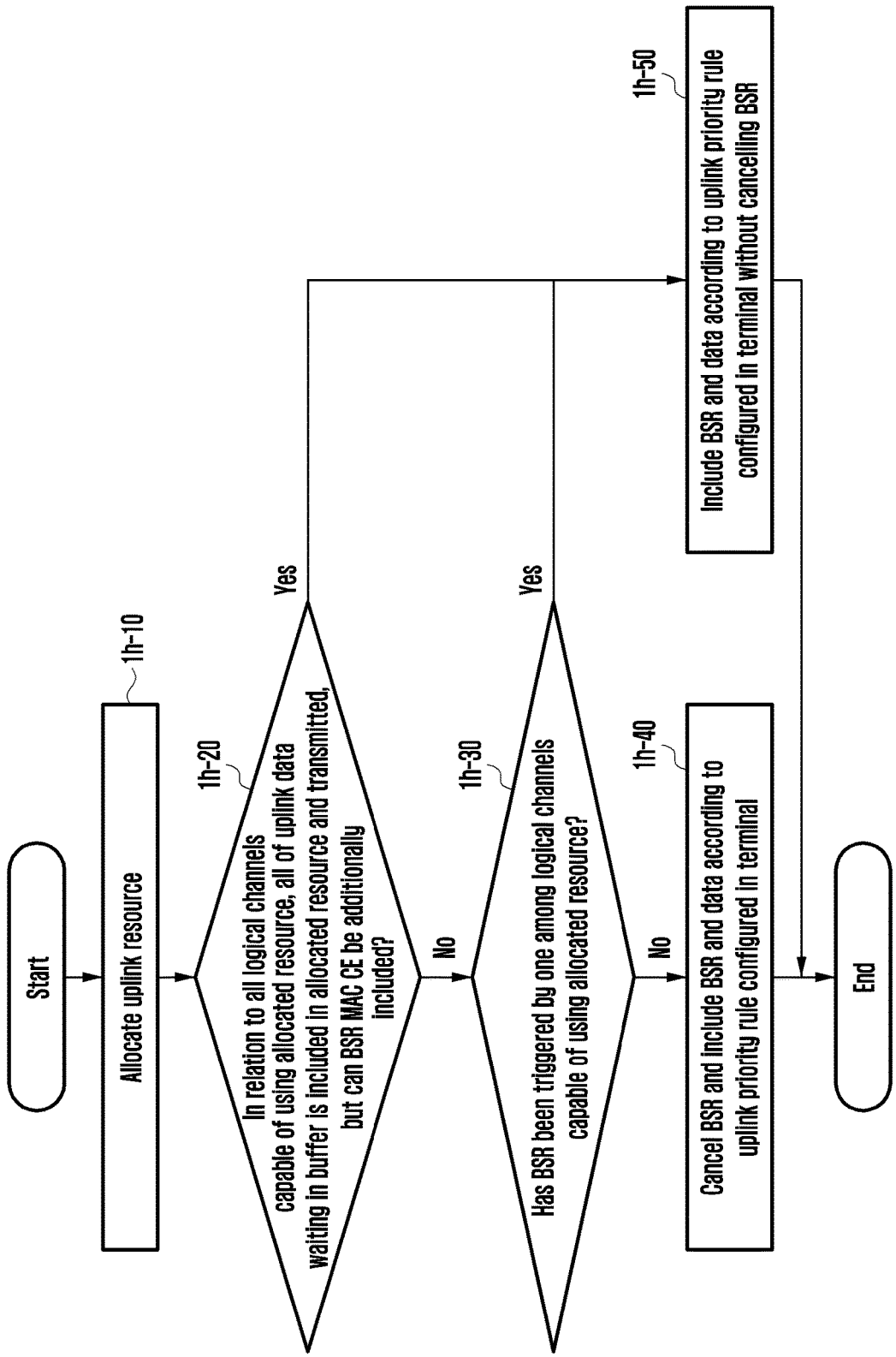

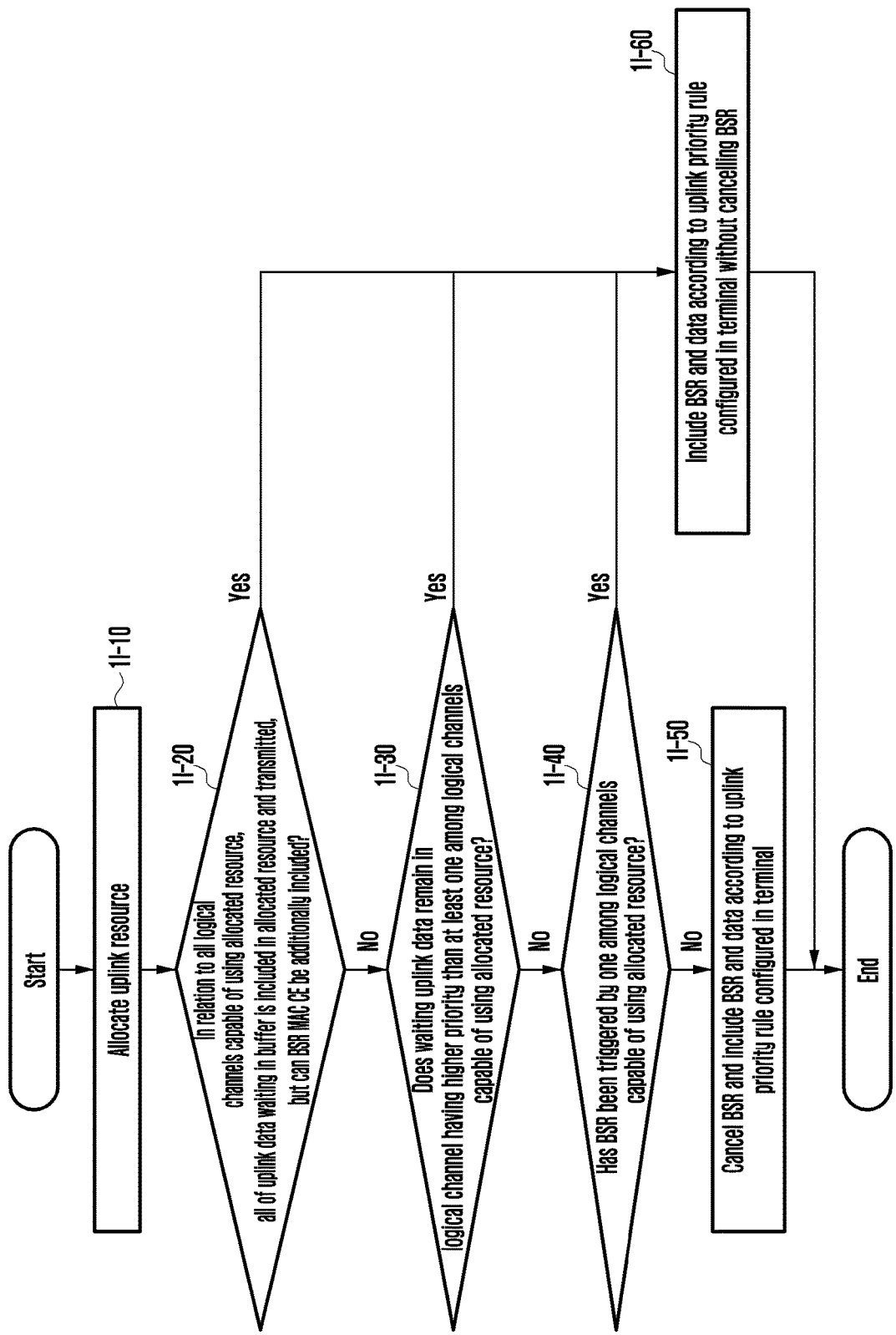

FIG. 1Q
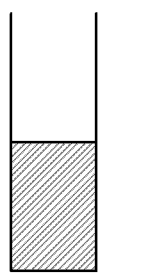
LCH1  
RegularBSRprohibit=True  
1q-10
LCH2  
RegularBSRprohibit=False  
1q-20

FIG. 2E
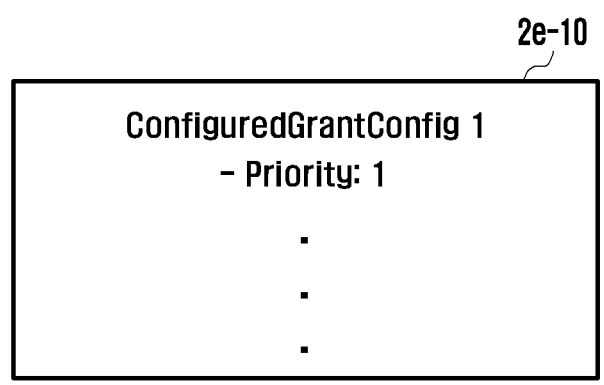
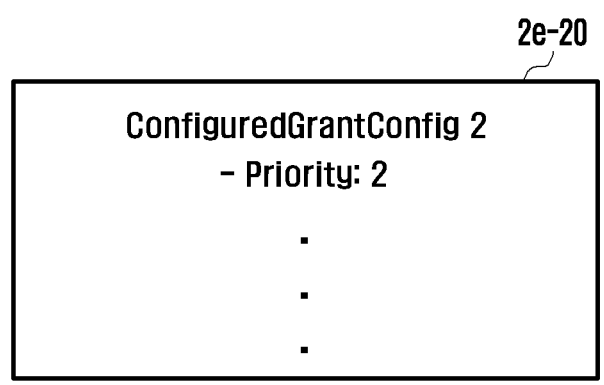

FIG. 2G
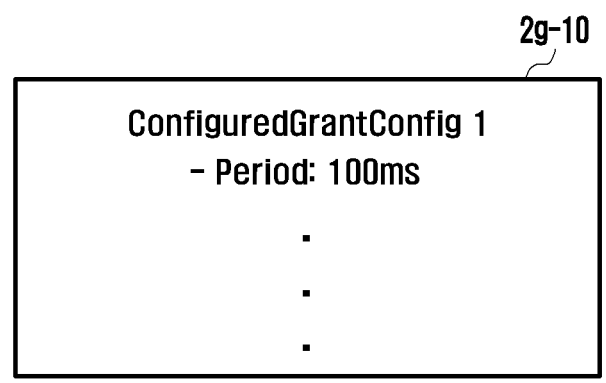
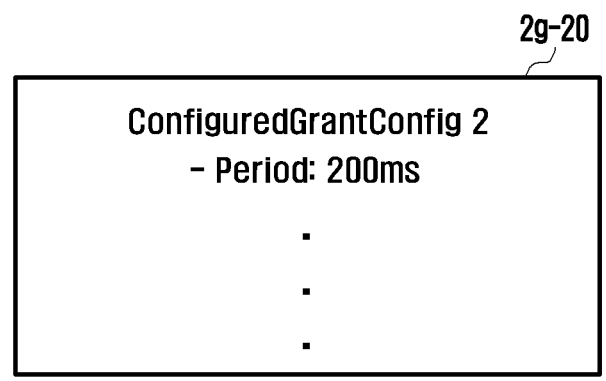

METHOD AND DEVICE FOR PERFORMING UPLINK STATUS REPORT FOR LOW LATENCY IN NEXT-GENERATION MOBILE COMMUNICATION SYSTEM

CROSS-REFERENCE TO RELATED APPLICATION(S)

This application is based on and claims priority under 35 U.S.C. § 119 to Korean Patent Application No. 10-2019-0001290, filed on Jan. 4, 2019, in the Korean Intellectual Property Office, the disclosure of which is incorporated by reference herein in its entirety.

BACKGROUND

1. Field

The disclosure relates generally to a next-generation communication system, and more particularly, to a method and a device for reporting an uplink status and determining resource priorities in a next-generation communication system.

2. Description of Related Art

In order to meet wireless data traffic demands, which have increased since the commercialization of a $4^{th}$-generation (4G) communication system, efforts have been made to develop an improved $5^{th}$-generation (5G) communication system or a pre-5G communication system, also referred to as a beyond-4G-network communication system or a post-long-term-evolution (post-LTE) system.

In order to achieve a high data transmission rate, implementation of the 5G communication system in a millimeter-wave (mmWave) band (e.g. a 60 GHz band) is being considered. In the 5G communication system, technologies such as beamforming, massive multiple-input multiple-output (massive MIMO), full-dimensional MIMO (FD-MIMO), array antenna, analog beamforming, and large-scale antenna technologies are being discussed as means to mitigate a propagation path loss in the mmWave band and increase a propagation transmission distance.

In order to improve the system network in the 5G communication system, development has progressed on technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and reception interference cancellation. In the 5G system, development has progressed on advanced coding modulation (ACM) schemes such as hybrid frequency shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA).

The Internet has evolved to an Internet-of-things (IoT) network in which distributed components such as objects exchange and process information. Internet-of-everything (IoE) technology, in which big-data processing technology using a connection with a cloud server or the like is combined with IoT technology, has emerged. In order to implement the IoT, technical factors such as a sensing technique, wired/wireless communication, network infrastructure, service-interface technology, and security technology are required, and research on technologies such as a sensor network, machine-to-machine (M2M) communication and machine-type communication (MTC) for connection between objects has recently been conducted.

In an IoT environment, through collection and analysis of data generated in connected objects, an intelligent Internet technology service to create new value in people's lives may be provided. The IoT may be applied to fields such as those of a smart home, smart building, smart city, smart car, connected car, smart grid, health care, smart home appliances, or high-tech medical service, through convergence between conventional information technology (IT) and various industries.

Accordingly, various attempts to apply a 5G communication system to the IoT network are being made. For example, 5G communication technology, such as a sensor network, M2M communication, and MTC, has been implemented using techniques such as beamforming, MIMO, and array antennas. The application of a cloud RAN as big-data processing technology described above may be an example of convergence of 5G technology and IoT technology.

Recently, with the development of next-generation mobile communication systems, studies have been made on communication technology for low latency. Particularly, there is a need for a method and a device for reporting an uplink status and determining resource priorities to reduce latency, both of which are factors that have not been addressed in the conventional art.

SUMMARY

Aspects of the present disclosure are to address at least the above mentioned problems and/or disadvantages and to provide at least the advantages described below. Accordingly, an aspect of the present disclosure is to provide a method for efficiently performing uplink status report for low latency in a next-generation mobile communication system.

Another aspect of the disclosure is to provide a method for determining resource priorities for low latency in a next-generation mobile communication system.

In accordance with an aspect of the disclosure, a method by a terminal in a wireless communication system includes receiving, from a base station, logical channel configuration information including first information on an allowed configured grant for each of at least one logical channel and second information on a priority for each of the at least one logical channel, identifying that an uplink grant for a first configured grant and an uplink grant for a second configured grant are overlapped, and transmitting, to the base station, the first configured grant having a priority that is higher than a priority of the second configured grant, based on the first information and the second information.

In accordance with another aspect of the disclosure, a method by a base station in a wireless communication system includes transmitting, to a terminal, logical channel configuration information including first information on an allowed configured grant for each of at least one logical channel, and receiving, from the terminal, a first configured grant, wherein the first configured grant is allowed to a first logical channel and a second configured grant is allowed to a second logical channel based on the first information, and wherein the first configured grant is transmitted based on the first configured grant being considered a prioritized configured grant, in case that an uplink grant for the first configured grant and an uplink grant for the second configured grant are overlapped. In accordance with another aspect of the disclosure, a terminal in a wireless communication system includes a transceiver, and a processor configured to receive, via the transceiver from a base station, logical channel configuration information including first information on an allowed configured grant for each of at least one logical channel, identify a first configured grant allowed to a first logical channel and a second configured grant allowed to a second logical channel, based on the first information, identify that an uplink grant for the first configured grant and an uplink grant for the second configured grant are overlapped, and transmit, via the transceiver to the base station, the first configured grant having a priority that is higher than a priority of the second configured grant.

In accordance with another aspect of the disclosure, a base station in a wireless communication system includes a transceiver, and a processor configured to transmit, via the transceiver to a terminal, logical channel configuration information including first information on an allowed configured grant for each of at least one logical channel, and receive, via the transceiver from the terminal, a first configured grant, wherein the first configured grant is allowed to a first logical channel and a second configured grant is allowed to a second logical channel based on the first information, and wherein the first configured grant is transmitted based on the first configured grant being considered a prioritized configured grant, in case that an uplink grant for the first configured grant and an uplink grant for the second configured grant are overlapped.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1F illustrates a BSR message processing method according to an embodiment;

FIG. 1G illustrates a BSR message processing method according to an embodiment;

FIG. 1H illustrates a BSR message processing method according to an embodiment;

FIG. 1L illustrates a BSR message processing method according to an embodiment;

FIG. 1O illustrates a method of including a truncated BSR message to which the disclosure is applied;

FIG. 1Q illustrates when a regular BSR message is not triggered according to an embodiment;

FIG. 2E illustrates a configured grant priority configuration method according to an embodiment;

FIG. 2G illustrates a configured grant priority configuration method according to an embodiment;

DETAILED DESCRIPTION

Hereinafter, embodiments will be described in detail in conjunction with the accompanying drawings. A detailed description of known functions or configurations incorporated herein will be omitted for the sake of clarity and conciseness. Terms which will be described below are defined in consideration of the functions in the disclosure, and may be different according to users, intentions of the users, or customs. Therefore, the definitions of the terms should be made based on the contents throughout the specification.

The advantages and features of the disclosure and manners to achieve them will be apparent by making reference to embodiments as described below in detail in conjunction with the accompanying drawings. However, the disclosure is not limited to the embodiments set forth below, and may be implemented in different forms. The following embodiments are provided only to make the disclosure complete and fully inform those skilled in the art, to which the disclosure

First Embodiment

Figure 1A:
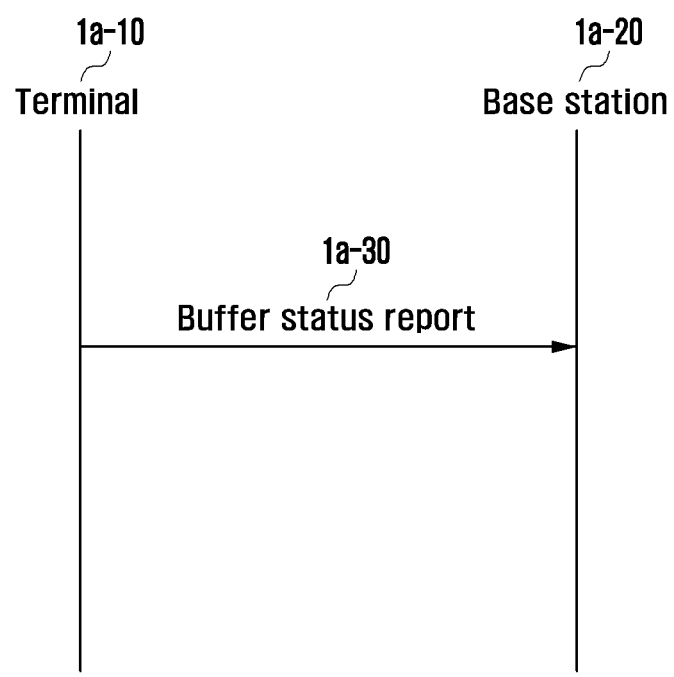
FIG. 1A illustrates an operation of transmitting a buffer status report (BSR) message to which the disclosure is applied.

FIG. 1A illustrates an operation of transmitting a BSR message in a wireless communication system to which the disclosure is applied. In FIG. 1A, terminal 1a-10 reports, to a base station 1a-20, the volume of uplink data that the terminal stores in a buffer in order to transmit the uplink data, and this reporting is referred to as a BSR 1a-30. The data volume to be reported may not be reported for all configured logical channels of the terminal. If the terminal reports the data volume for all of the configured logical channels, the size of a BSR message to be reported may become excessively large when multiple logical channels are configured, which may degrade coverage or may deplete radio resources. Thus, in relation to the BSR message, the configured logical channels are classified into several logical channel groups and the total volume of data stored on all logical channels belonging to the logical channel groups is reported to the base station.

The BSR message may be classified into a periodic BSR, a regular BSR, a padding BSR, etc. according to the sending time and the volume of information.

The periodic BSR is used when the base station receives a report on a data volume at a predetermined period. The volume of data stored in the terminal changes in real time depending on the wireless communication procedure between the base station and the terminal and on the operation of a data application. Thus, the periodic transmission is required in order for the base station to continuously update the data volume. For the transmission of the periodic BSR, the base station may configure the value of a periodic-BSR timer for the terminal, and may perform a periodic BSR transmission procedure when the timer expires.

The regular BSR is transmitted to the base station from the terminal when the terminal is required to transmit, to the base station, new data generated in a logical channel having a higher priority than a logical channel in which data already exists, or when data to be stored in a specific logical channel group by the terminal is no longer generated. The base station may use the BSR for uplink scheduling.

The padding BSR is included and transmitted in remaining resource space after data is included in a medium access control layer protocol data unit (MAC PDU) allocated to the terminal. When the padding BSR is not transmitted, the corresponding radio resource may be used as simple padding, thus wasting radio resources. Therefore, sending a BSR in this resource enables the terminal to more accurately transfer a resource situation of the terminal to the base station. Thus, in a communication system, a padding BSR may be forced or recommended to be transmitted.

A BSR message is divided into a long BSR and a short BSR according to the type of message. The short BSR is used to report the buffer size of one logical channel group (LCG), and the long BSR is used to report the buffer size of each of two or more logical channel groups Values included in the short BSR may be an LCG identifier (LCG ID) and a buffer size value indicating which logical channel group has a buffer size to be reported.

Figure 1B:
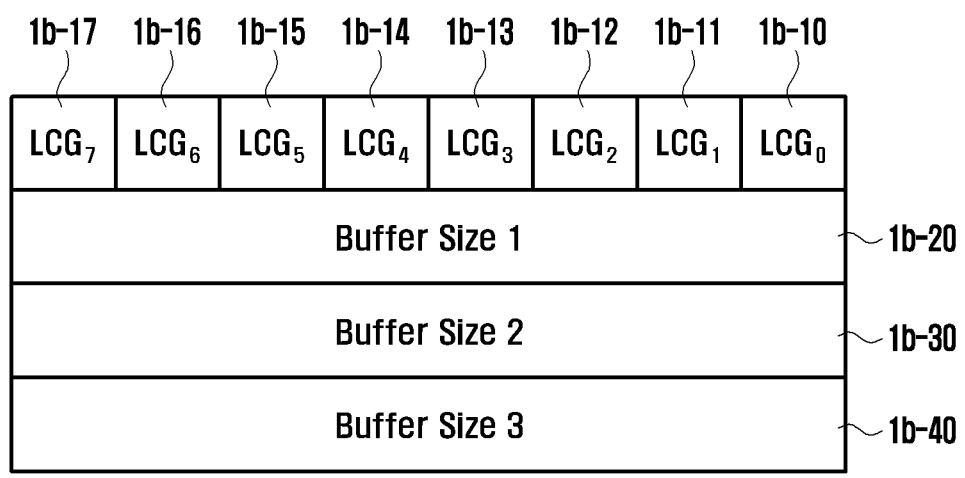
FIG. 1B illustrates a format of a long BSR to which the disclosure is applied.

FIG. 1B illustrates one embodiment of a format of a long BSR to which the disclosure is applied. The long BSR may include LCGi fields 1b-10 to 1b-17 indicating whether each logical channel group stores data and buffer size fields 1b-20, 1b-30, and 1b-40 indicating the volume of data stored by an actual logical channel group. Index i of the LCGi fields refers to an LCG ID. For example, an $LCG_3$ field indicates whether there is data stored by logical channel group 3. That is, an LCGi field set to 0 indicates that there is no data stored by a corresponding logical channel group, and an LCGi field set to 1 indicates that there is data stored by a corresponding logical channel group.

However, in the long BSR, the buffer sizes of all logical channel groups having an LCGi field indicated by a value of 1 may not be included in the BSR according to the amount of an allocated resource. Therefore, in this instance, a report is performed only on the buffer size of a logical channel group selected from among logical channel groups including a logical channel storing data. The BSR, which does not include the buffer sizes of all logical channel groups having an LCGi field indicated by a value of 1, as described above, may be particularly referred to as a long truncated BSR. The long truncated BSR may be distinguished from a long BSR, using the corresponding logical channel identifier or the like.

FIG. 1B illustrates an example in which the buffer sizes 1b-20, 1b-30, and 1b-40 of three logical channel groups are reported. The long BSR is a long truncated BSR when four or more LCGi fields are indicated by a value of 1 and is not a long truncated BSR when three LCGi fields are indicated by a value of 1.

Figure 1C:
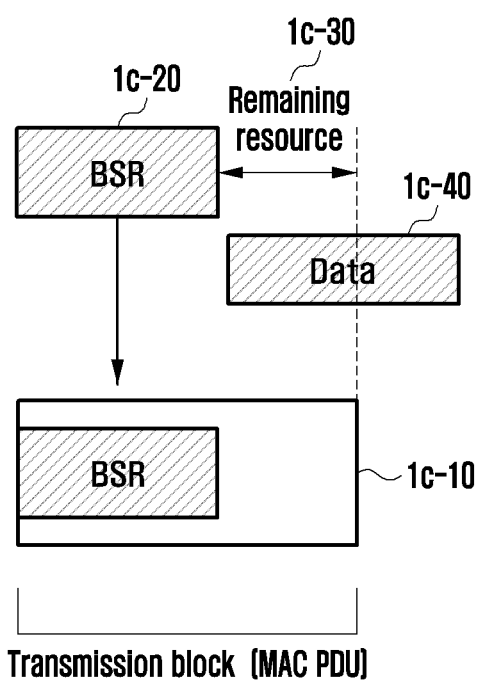
FIG. 1C illustrates when a BSR message is included in a transmission block to which the disclosure is applied.

FIG. 1C illustrates when a BSR message is included in a transmission block to which the disclosure is applied. In FIG. 1C, when a transmission block 1c-10 to be transmitted to a base station through an uplink is allocated to a terminal, the terminal determines the volume of data to be included in the transmission block, which is referred to as multiplexing or logical channel prioritization depending on the detailed steps thereof, and the transmission block may include all logical channels capable of using the transmission block and MAC control elements (MAC CEs) to be transmitted. "Transmission block" refers to a MAC layer, and is also referred to as a MAC PDU.

When the terminal is allocated the transmission block 1c-10 to be transmitted to the base station through an uplink and performs a multiplexing or logical channel prioritization procedure, if there is a BSR message 1c-20 to be transmitted by the terminal, the BSR message is prioritized over data and may be included in the transmission block first before the data. The fact that the BSR message is included first does not require the message to be positioned at the front of the transmission block, and indicates that the BSR message is determined to be included in the transmission block and may be allocated a resource before the data.

When the amount of the remaining resource 1c-30 which has not been allocated to the BSR message is less than the volume of remaining data 1c-40, not all of the remaining data may be included in the transmission block. Packet segmentation may be required, and a part of segmented data may be transmitted in an allocated block 1c-10 and the rest of the segmented data may be transmitted in a subsequently allocated transmission block. However, when packet segmentation occurs, data can be processed in a receiver only when all segments arrive at the receiver, and thus an additional delay time related to transmission time may occur. FIG. 1C illustrate an example in which a BSR message is prioritized over data, but the same problem may also occur in a MAC CE having a higher priority than data.

Figure 1D:
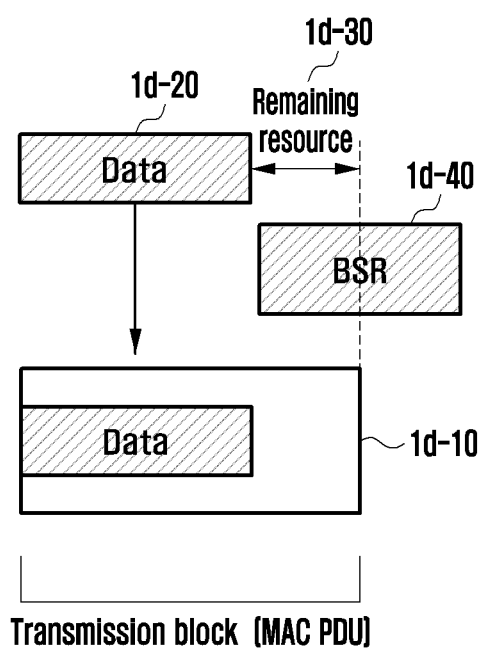
FIG. 1D illustrates another scenario in which a BSR message is included in a transmission block to which the disclosure is applied.

FIG. 1D illustrates another scenario in which a BSR message is included in a transmission block to which the disclosure is applied. In FIG. 1D, when a transmission block 1d-10 to be transmitted to a base station through an uplink is allocated to a terminal, the terminal determines the volume of data to be included in the transmission block. This process is referred to as multiplexing or logical channel prioritization depending on the detailed steps thereof, and the transmission block may include all logical channels capable of using the transmission block and MAC CEs to be transmitted.

When the terminal is allocated the transmission block 1d-10 to be transmitted to the base station through an uplink and performs a multiplexing or logical channel prioritization procedure, if there is a BSR message 1d-40 to be transmitted by the terminal, the terminal may determine whether the volume of data to be actually sent and the size of the BSR message can be included in the allocated transmission block. Data 1d-20 is prioritized over the BSR message and may be included in the transmission block before the BSR message. In this instance, the data to be transmitted may have a higher priority for a specific service, such as an ultra-reliability and low-latency communication (URLLC) service.

When the data is included in the transmission block but the remaining resource 1d-30 is not sufficient to include the BSR message 1d-40, the BSR message may not be sent in the transmission block. In this instance, the BSR message may be cancelled, or may be transmitted in a subsequently allocated transmission block. A short truncated BSR or a long truncated BSR may be transmitted instead.

In another embodiment, the BSR message is prioritized over the data and may be included in the transmission block before the data. In this instance, the fact that the BSR message is included first does not require the message to be positioned at the front of the transmission block and indicates that the BSR message is determined to be included in the transmission block and may be allocated a resource before the data.

When the amount of the remaining resource 1d-30 that has not been allocated to the BSR message is less than the volume of remaining data 1d-10, not all of the remaining data may be included in the transmission block. In this instance, in order to prevent packet segmentation and an additional delay time due to the packet segmentation, the BSR message may not be transmitted, or a short truncated BSR or long truncated BSR may be transmitted and the data may be transmitted in the corresponding transmission block. FIG. 1D illustrates an example of a BSR message, but the same problem may also occur in a MAC CE.

Figure 1E:
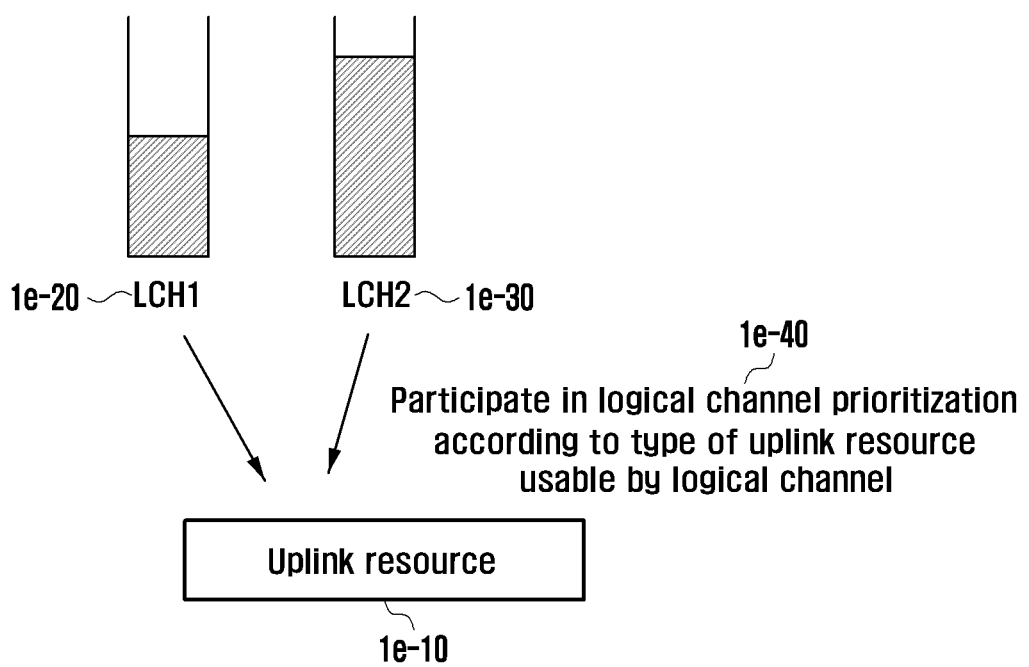
FIG. 1E illustrates a logical channel prioritization procedure based on uplink resource allocation to which the disclosure is applied

FIG. 1E illustrates a logical channel prioritization procedure based on uplink resource allocation to which the disclosure is applied. An uplink resource 1e-10 allocated to a terminal is allocated in a terminal unit. Specifically, it is determined which logical channel uses resources and how many resources are used, through a logical channel prioritization procedure of the terminal. Not all of the logical channels configured for the terminal participate in the logical channel prioritization procedure. Whether logical channels 1e-20 and 1e-30 participate in logical channel prioritization is determined according to the type of uplink resource that can be used by the logical channels 1e-40. To this end, the type of uplink resource usable by each logical channel may be configured as follows:

Only a resource of a designated cell can be used.
Only a resource using designated subcarrier spacing can be used.
Only a resource having a designated physical uplink shared channel (PUSCH) can be used.
Only a resource of a designated configured grant (CG) can be used.
Only a resource scrambled with a specific radio network temporary identifier (RNTI) can be used.

In one embodiment, only a resource satisfying one of the above conditions may be used, or in another embodiment, only a resource satisfying all of two or more conditions may be used.

FIG. 1F illustrates a BSR message processing method according to an embodiment. In FIG. 1F, when an uplink resource is allocated to a terminal in step 1f-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for the BSR message, may be included in the allocated resource and transmitted. However, the terminal determines whether the allocated resource is sufficient to include the BSR message in step 1f-20, and when the allocated resource is not sufficient to include the BSR message, the terminal may cancel the BSR message and perform a logical channel prioritization procedure according to an uplink priority rule configured in the terminal so as to include the data in the allocated resource and transmit the same in step 1f-30.

The BSR message may not be cancelled in step 1f-30 and may not be merely transmitted in the corresponding uplink resource. When a long truncated BSR or a short truncated BSR can be included in place of the cancelled BSR message, the long truncated BSR or the short truncated BSR may be included and transmitted. When the allocated resource is sufficient to include the BSR message, the terminal may perform a logical channel prioritization procedure according to an uplink priority rule configured in the terminal without cancelling the BSR message, so as to include the BSR message and the data in the allocated resource and transmit the same in step 1f-40).

For example, when an uplink resource is allocated, one of multiple configured logical channels can use the uplink resource, and all data to be transmitted on the logical channel can be transmitted in the allocated resource, but a BSR message to be transmitted cannot be transmitted while being included in the allocated resource. Thus, the BSR message may be cancelled or transmitted later. In the embodiment of FIG. 1F, in relation to all logical channels capable of using an allocated resource, all of uplink data waiting in a buffer except for a BSR message may be included in the allocated resource and transmitted, but the BSR message is not transmitted when the allocated resource is not sufficient to include the BSR message. However, this description has been made taking a BSR message as an example, and may also apply to other general MAC CEs, such as a power headroom report (PHR) MAC CE and a recommended bit rate (RBR) query MAC CE.

FIG. 1G illustrates a BSR message processing method according to an embodiment. In FIG. 1G, when an uplink resource is allocated to a terminal in step 1g-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1g-20. When the allocated resource is not sufficient to include the BSR message and the BSR message has been triggered by one of the logical channels capable of using the corresponding resources in step 1g-30, the terminal may cancel the BSR message and perform a logical channel prioritization procedure according to an uplink priority rule configured in the terminal so as to include the data in the allocated resource and transmit the same in step 1g-40.

The BSR message may not be cancelled in step 1g-40 and may be not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient to include the BSR message as a result of determining whether the allocated resource is sufficient to include the BSR message in step 1g-20, or when the condition of step 1g-30 is not satisfied, the terminal may perform a logical channel prioritization procedure according to an uplink priority rule configured in the terminal without cancelling the BSR message so as to include the BSR message and the data in the allocated resource and transmit the same in step 1g-50.

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, the BSR message to be transmitted has been triggered by the logical channel, and the BSR message may be cancelled or transmitted later.

FIG. 1H illustrates a BSR message processing method according to an embodiment. In FIG. 1H, when an uplink resource is allocated to a terminal in step 1h-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1h-20. When the allocated resource is not sufficient to include the BSR message and the BSR message has not been triggered by one of the logical channels capable of using the corresponding resources in step 1h-30, the terminal may cancel the BSR message and perform a logical channel prioritization procedure according to an uplink priority rule configured in the terminal so as to include the data in the allocated resource and transmit the data in step 1h-40.

The BSR message may not be cancelled in step 1h-40 and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient to include the BSR message as a result of determining whether the allocated resource is sufficient to include the BSR message in step 1h-20 or when it is determined that the BSR message has been triggered by one of logical channels capable of using the corresponding resource according to step 1h-30, the terminal may perform a logical channel prioritization procedure according to an uplink priority rule configured in the terminal without cancelling the BSR message so as to include the BSR message and the data in the allocated resource and transmit the data in step 1h-50.

For example, when an uplink resource is allocated, one of multiple configured logical channels can use the uplink resource, and all data to be transmitted on the logical channel can be transmitted in the allocated resource but a BSR message to be transmitted cannot be transmitted while being included in the allocated resource. Thus, the BSR message to be transmitted has not been triggered by the logical channel, and the BSR message may be cancelled or transmitted later.

Figure 1I:
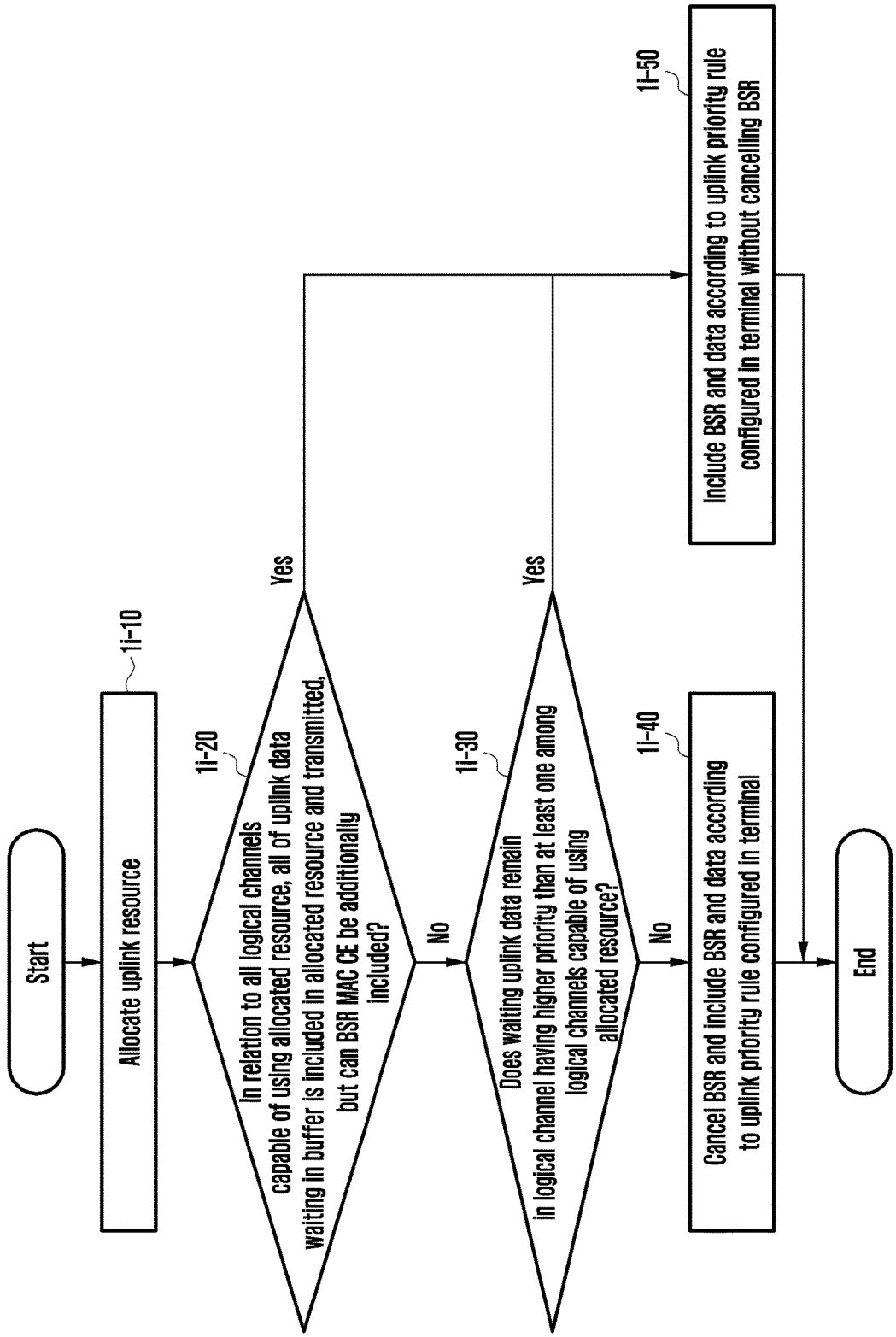
FIG. 1I illustrates a BSR message processing method according to an embodiment.

FIG. 1I illustrates a BSR message processing method according to an embodiment. When an uplink resource is allocated to a terminal in step 1i-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1i-20. When the allocated resource is not sufficient to include the BSR message, the terminal determines whether waiting uplink data remain in a logical channel having a higher priority than at least one of the logical channels capable of using the allocated resource in step 1i-30. When the waiting uplink data does not remain, the terminal may cancel the BSR message and perform a logical channel prioritization procedure according to an uplink priority rule configured in the terminal so as to include the data in the allocated resource and transmit the data in step 1i-40.

The BSR message may not be cancelled in step 1i-40 and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient to include the BSR message as a result of determining whether the allocated resource is sufficient to include the BSR message in step 1i-20 or when it is determined that the waiting uplink data remain according to step 1i-30, the terminal may perform a logical channel prioritization procedure according to an uplink priority rule configured in the terminal without cancelling the BSR message, so as to include the BSR message and the data in the allocated resource and transmit the data in step 1l-50.

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, waiting uplink data does not remain in a logical channel having a higher priority than the corresponding logical channel, and the BSR message may be cancelled or transmitted later.

Figure 1J:
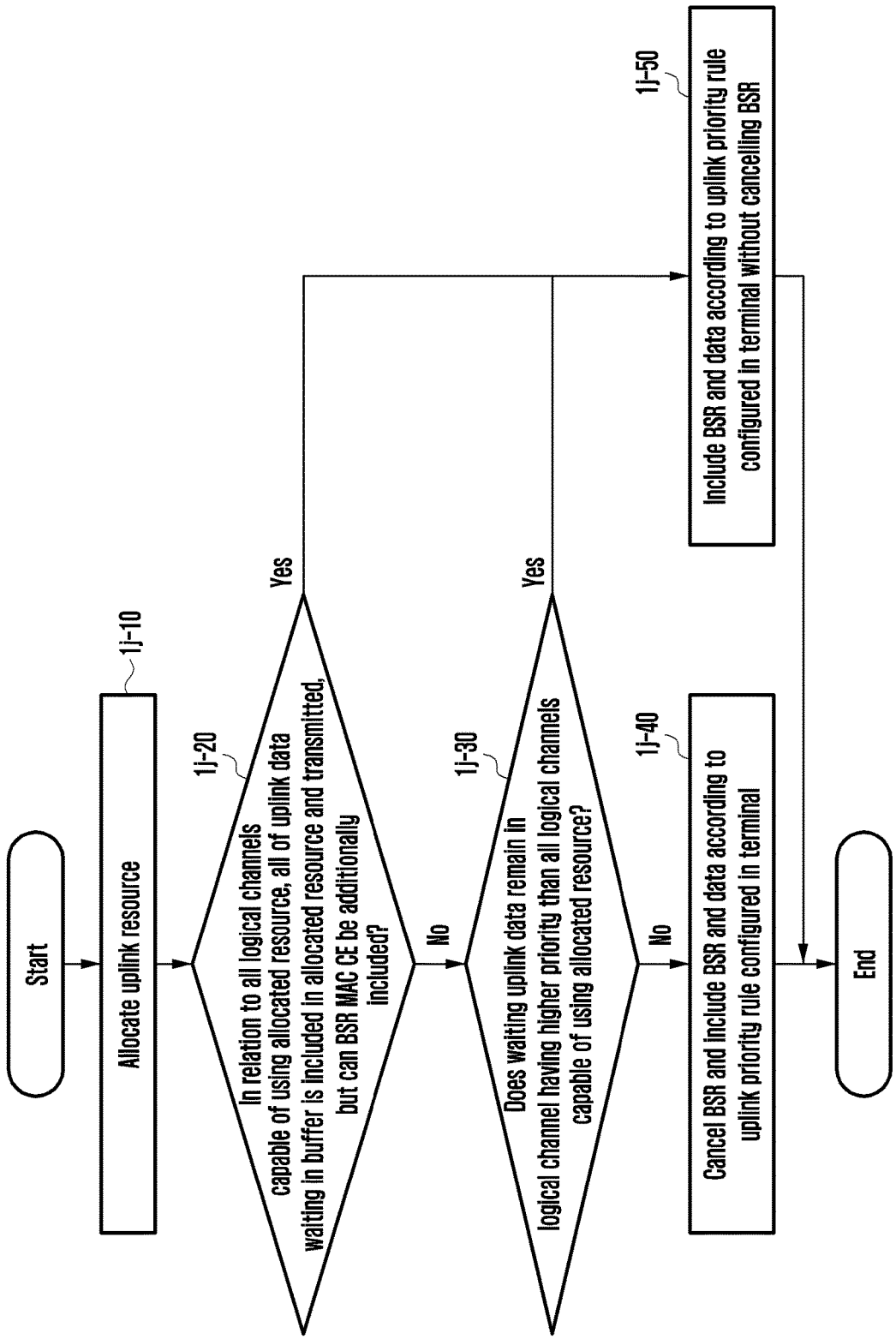
FIG. 1J illustrates a BSR message processing method according to an embodiment.

FIG. 1J illustrates a BSR message processing method according to an embodiment. In FIG. 1J, when an uplink resource is allocated to a terminal in step 1j-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1j-20, and when the allocated resource is not sufficient to include the BSR message, the terminal determines whether waiting uplink data remain in a logical channel having a higher priority than all logical channels capable of using the allocated resource in step 1j-30. When waiting uplink data does not remain, the terminal may cancel the BSR message and perform a logical channel prioritization procedure according to an uplink priority rule configured in the terminal so as to include the data in the allocated resource and transmit the same in step 1j-40.

The BSR message may not be cancelled in step 1j-40 and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient to include the BSR message as a result of determining whether the allocated resource is sufficient to include the BSR message in step 1j-20 or when waiting uplink data is determined to remain according to operation 1j-30, the terminal may perform a logical channel prioritization procedure according to an uplink priority rule configured in the terminal without cancelling the BSR message, so as to include the BSR message and the data in the allocated resource and transmit the same in step 1j-50.

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, waiting uplink data does not remain in a logical channel having a higher priority than the corresponding logical channel, and the BSR message may be cancelled or transmitted later.

Figure 1K:
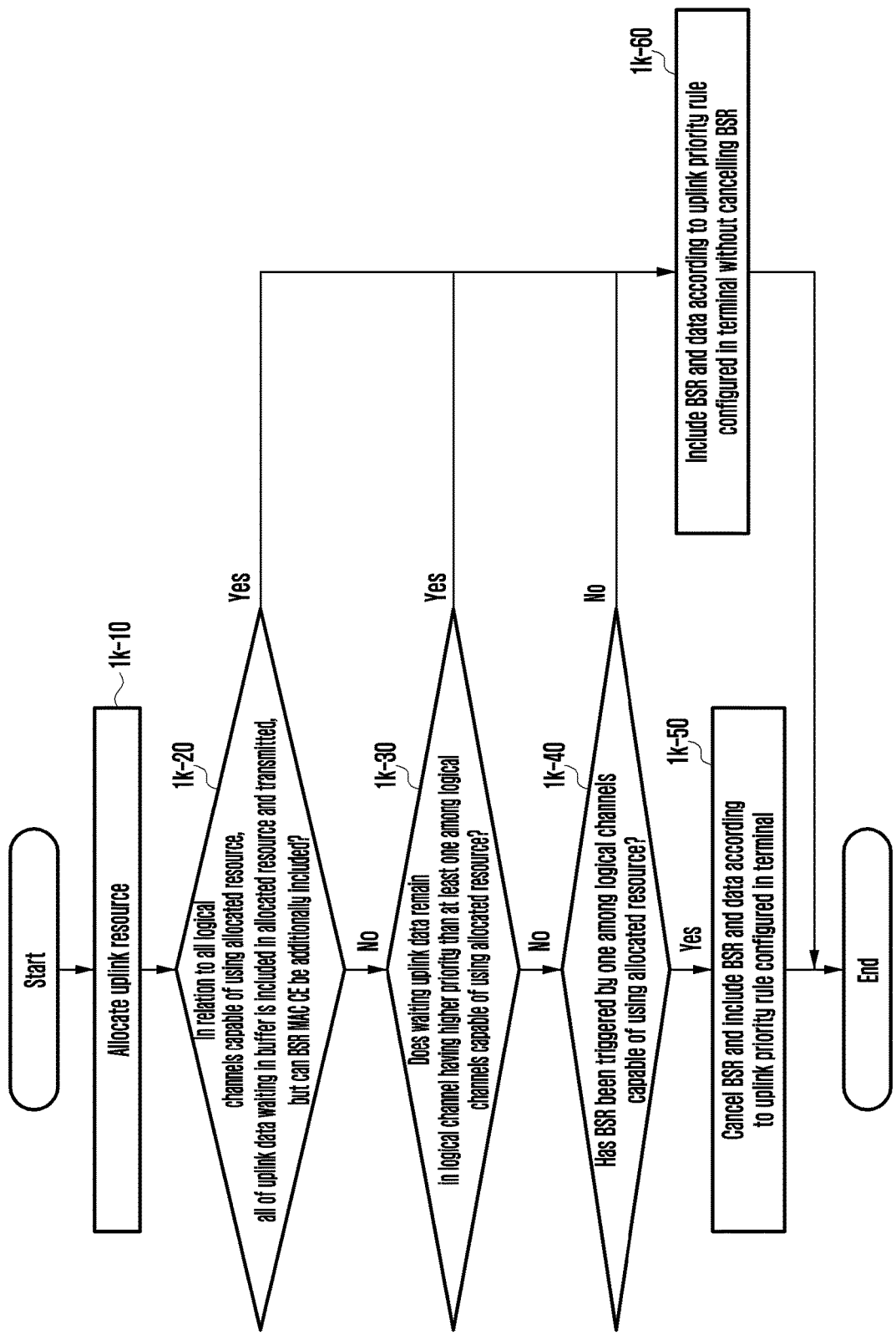
FIG. 1K illustrates a BSR message processing method according to an embodiment.

FIG. 1K illustrates a BSR message processing method according to an embodiment. In FIG. 1K, when an uplink resource is allocated to a terminal in step 1k-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1k-20, and when the allocated resource is not sufficient to include the BSR message, the terminal determines whether waiting uplink data remain in a logical channel having a higher priority than at least one of the logical channels capable of using the allocated resource in step 1k-30.

When waiting uplink data does not remain and the BSR message has been triggered by one of the logical channels capable of using the allocated resource in step 1k-40, the terminal may cancel the BSR message and perform a logical channel prioritization procedure according to an uplink priority rule configured in the terminal so as to include the data in the allocated resource and transmit the same in step 1k-50.

The BSR message may not be cancelled in step 1k-50 and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient to include the BSR message as a result of determining whether the allocated resource is sufficient to include the BSR message in step 1k-20, when waiting uplink data is determined to remain according to step 1k-30, or when the condition of step 1k-40 is not satisfied, the terminal may perform a logical channel prioritization procedure according to an uplink priority rule configured in the terminal without cancelling the BSR message so as to include the BSR message and the data in the allocated resource and transmit the same in step 1k-60.

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, waiting uplink data does not remain in a logical channel having a higher priority than the corresponding logical channel, the BSR message has been triggered by the corresponding logical channel, and the BSR message may be cancelled or transmitted later.

FIG. 1L illustrates a BSR message processing method according to an embodiment. In FIG. 1L, when an uplink resource is allocated to a terminal in step 1l-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1l-20, and when the allocated resource is not sufficient to include the BSR message, the terminal determines whether waiting uplink data remain in a logical channel having a higher priority than at least one of the logical channels capable of using the allocated resource in step 1l-30. When waiting uplink data does not remain, the terminal determines whether the BSR message has been triggered by one of the logical channels capable of using the allocated resource in step 1l-4: When the BSR message is determined not to have been triggered by one of the logical channels, the terminal may cancel the BSR message and perform a logical channel prioritization procedure according to an uplink priority rule configured in the terminal so as to include the data in the allocated resource and transmit the same in step 1l-50.

The BSR message may not be cancelled in step 1l-50 and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient to include the BSR message as a result of determining whether the allocated resource is sufficient to include the BSR message in step 1l-20, when the waiting uplink data is determined to remain according to step 1l-30, or when the BSR message is determined to have been triggered by one of the logical channels according to step 1l-40, the terminal may perform a logical channel prioritization procedure according to an uplink priority rule configured in the terminal without cancelling the BSR message so as to include the BSR message and the data in the allocated resource and transmit the same in step 1*l*-60.

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, waiting uplink data does not remain in a logical channel having a higher priority than the corresponding logical channel, the BSR message has not been triggered by the corresponding logical channel, and the BSR message may be cancelled or transmitted later.

Figure 1M:
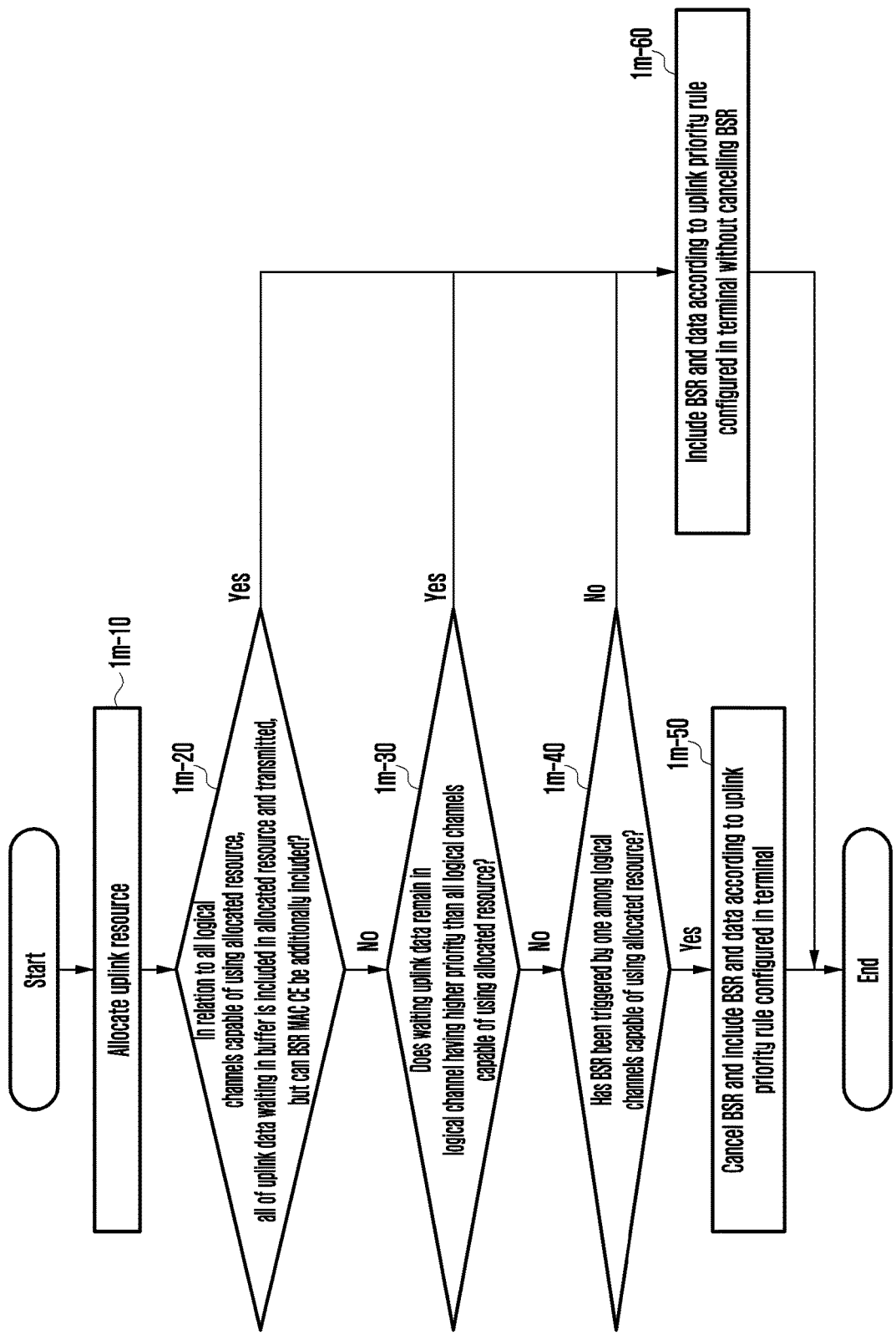
FIG. 1M illustrates a BSR message processing method according to an embodiment.

FIG. 1M illustrates a BSR message processing method according to an embodiment. In FIG. 1M, when an uplink resource is allocated to a terminal in step 1*m*-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1*m*-20, and when the allocated resource is not sufficient to include the BSR message, the terminal determines whether waiting uplink data remain in a logical channel having a higher priority than all logical channels capable of using the allocated resource in step 1*m*-30. When waiting uplink data does not remain and when the BSR message has been triggered by one of the logical channels capable of using the allocated resource in step 1*m*-40, the terminal may cancel the BSR message and perform a logical channel prioritization procedure according to an uplink priority rule configured in the terminal so as to include the data in the allocated resource and transmit the same in step 1*m*-50.

The BSR message may not be cancelled in step 1*m*-50 and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient as a result of determining whether the allocated resource is sufficient to include the BSR message in step 1*m*-20), when waiting uplink data is determined to remain according to step 1*m*-30, or when the condition of step 1*m*-40 is not satisfied, the terminal may perform a logical channel prioritization procedure according to an uplink priority rule configured in the terminal without cancelling the BSR message so as to include the BSR message and the data in the allocated resource and transmit the same in step 1*m*-60).

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, waiting uplink data does not remain in a logical channel having a higher priority than the corresponding logical channel, the BSR message has been triggered by the corresponding logical channel, and the BSR message may be cancelled or transmitted later.

Figure 1N:
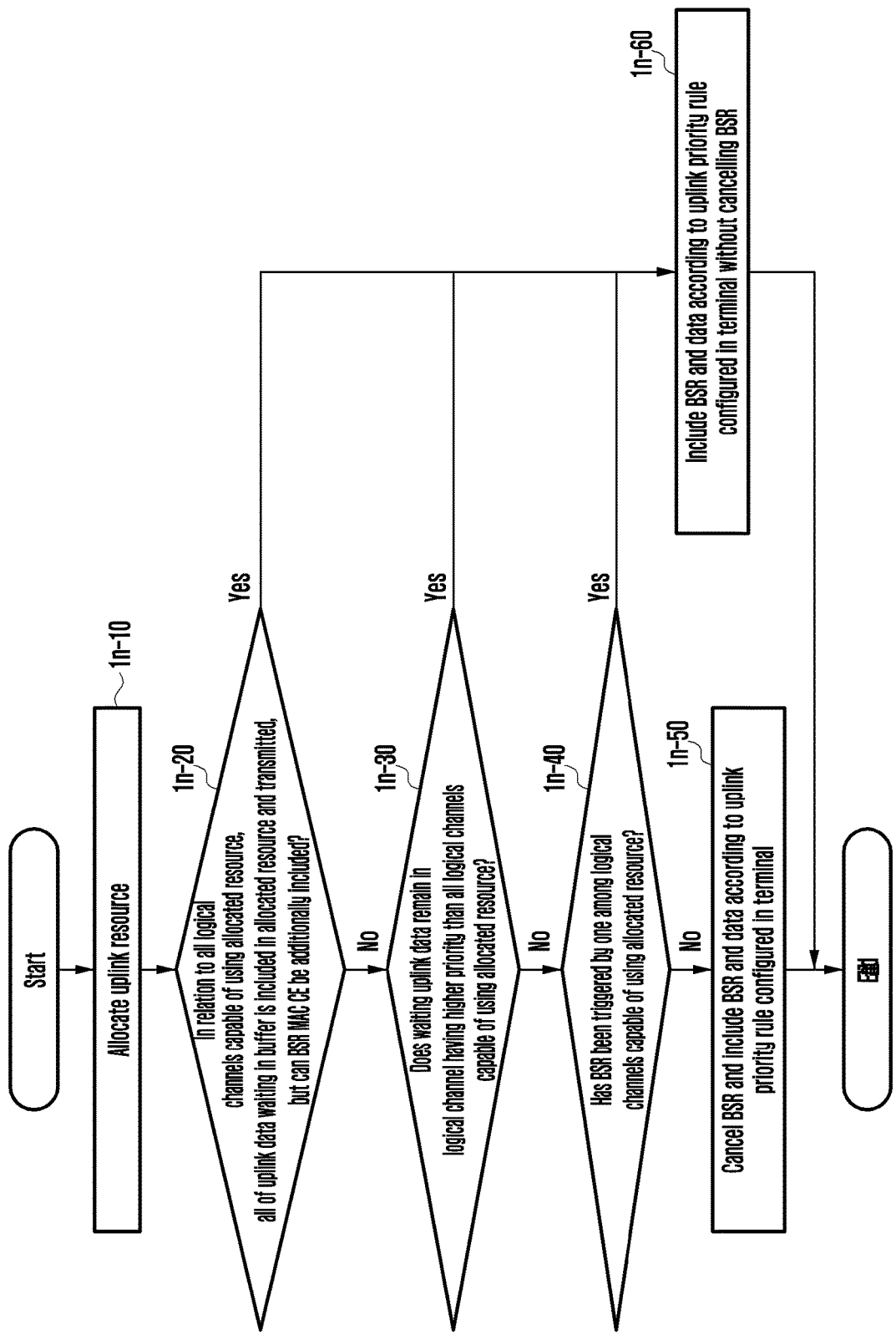
FIG. 1N illustrates a BSR message processing method according to an embodiment.
Figure 10:
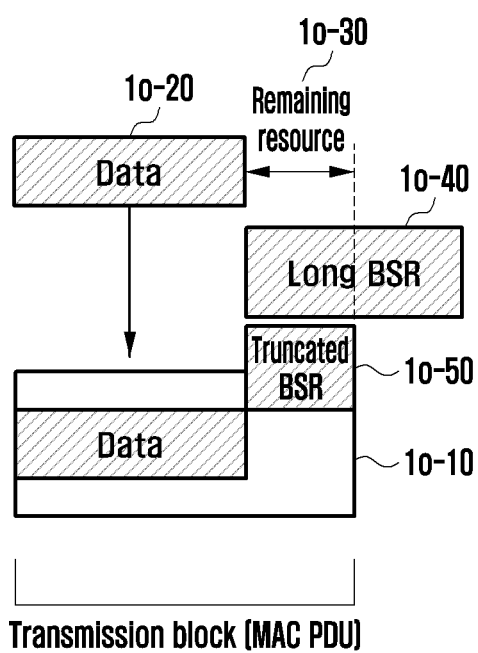

FIG. 1N illustrates a BSR message processing method according to an embodiment. in FIG. 1N, when an uplink resource is allocated to a terminal in step 1*n*-10, the terminal performs logical channel prioritization. An available logical channel that can use the allocated resource is determined by the configuration of an uplink resource usable by a logical channel, described with reference to FIG. 1E.

In relation to all logical channels capable of using the allocated resource, all of uplink data waiting in a buffer, except for a BSR message, may be included in the allocated resource and transmitted. However, the terminal determines whether the allocated resource is sufficient to include the BSR message in step 1*n*-20, and when the allocated resource is not sufficient, the terminal determines whether waiting uplink data remain in a logical channel having a higher priority than all logical channels capable of using the allocated resource in step 1*n*-30.

When waiting uplink data does not remain, the terminal determines whether the BSR message has been triggered by one of the logical channels capable of using the allocated resource in step 1*n*-40. Then, when the BSR message has not been triggered by one of the logical channels, the terminal may cancel the BSR message and perform a logical channel prioritization procedure according to an uplink priority rule configured in the terminal so as to include the data in the allocated resource and transmit the same in step 1*n*-50.

In step 1*n*-50, the BSR message may not be cancelled and may not be merely transmitted in the corresponding uplink resource. When a long truncated BSR or a short truncated BSR can be included in place of the cancelled BSR message, the long truncated BSR or the short truncated BSR may be included and transmitted.

When the allocated resource is determined to be sufficient as a result of determining whether the allocated resource is sufficient to include the BSR message in step 1*n*-20, when waiting uplink data is determined to remain according to step 1*n*-30, or when the BSR message is determined to have been triggered by one of the logical channels according to step 1*n*-40, the terminal may perform a logical channel prioritization procedure according to an uplink priority rule configured in the terminal without cancelling the BSR message so as to include the BSR message and the data in the allocated resource and transmit the data in step 1*n*-60.

For example, when an uplink resource is allocated, one of multiple configured logical channels can use the uplink resource, all data to be transmitted on the logical channel can be transmitted in the allocated resource but a BSR message to be transmitted cannot be transmitted while being included in the allocated resource. Thus, waiting uplink data does not remain in a logical channel having a higher priority than the corresponding logical channel, the BSR message has not been triggered by the corresponding logical channel, and the BSR message may be cancelled or transmitted later.

FIG. 1O illustrates a method of including a truncated BSR message to which instance the disclosure is applied. In FIG. 1O, when a transmission block 1*o*-10 to be transmitted to a base station through an uplink is allocated to a terminal, the terminal determines the volume of data to be included in the transmission block. This process is referred to as multiplexing or logical channel prioritization depending on the detailed steps thereof, and the transmission block may include all logical channels capable of using the transmission block and MAC CEs to be transmitted.

When the terminal is allocated the transmission block 1*o*-10 to be transmitted to the base station through an uplink and performs a multiplexing or logical channel prioritization procedure, if there is a BSR message 1*o*-40 to be transmitted by the terminal, the BSR message is prioritized over data and may be included in the transmission block first before the data. The fact that the BSR message is included first does not require the message to be positioned at the front of the transmission block, and indicates that the BSR message is determined to be included in the transmission block and may be allocated a resource before the data. However, the BSR message may not be included in the transmission block depending on the volume of data to be transmitted by the terminal. In this instance, all of the remaining data 1o-20 of a logical channel capable of using the corresponding transmission block may be transmitted in the transmission block.

When the amount of the remaining resource 1o-30 is less than the volume of a BSR message 1o-40, the BSR message may not be included in the transmission block. When a truncated BSR message 1o-50 can be included in the remaining resource 1o-30, the truncated BSR message may be included in the transmission block. FIG. 1O illustrates an example in which a BSR message is prioritized over data, but the same problem may also occur in a MAC CE having a higher priority than data.

Figure 1P:
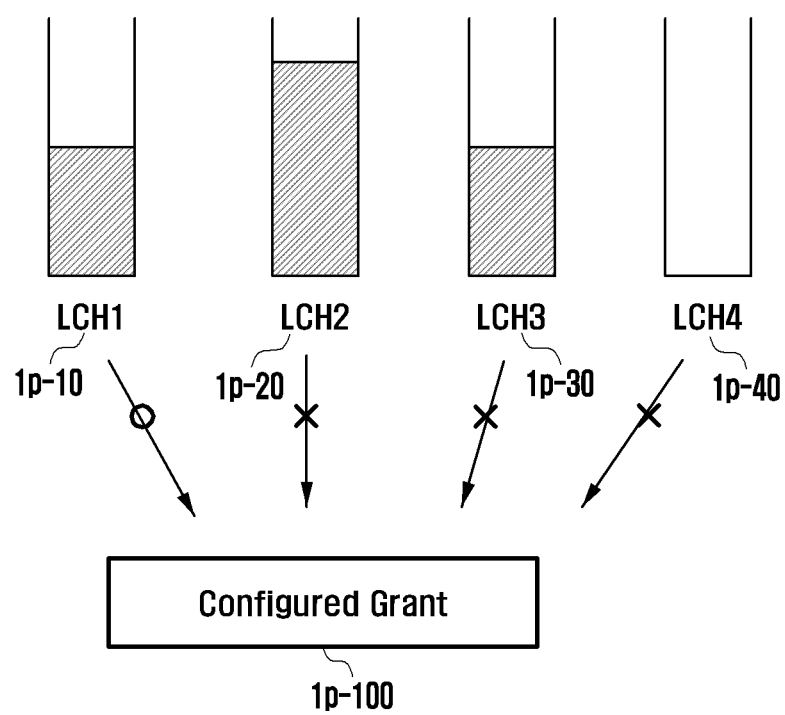
FIG. 1P illustrates when a regular BSR message is not triggered according to an embodiment.

FIG. 1P illustrates when a regular BSR message is not triggered according to an embodiment. In FIG. 1P, it is assumed that a total of four logical channels 1p-10, 1p-20, 1p-30, and 1p-40 are configured in a terminal. Logical channel 1 (1p-10) is configured to be able use a specific configured grant resource 1p-100, and logical channel 2 (1p-20), logical channel 3 (1p-30), and logical channel 4 (1p-40) are configured to be unable to use the configured grant. In other words, the only logical channel capable of using the configured grant is logical channel 1 (1p-10). In this instance, a base station may predict the traffic pattern of logical channel 1 and may allocate, to the configured grant, a resource sufficiently large to transmit logical channel 1. Thus, data to be sent in logical channel 1 may not be required to be reported to the base station through a regular BSR message or the like. Therefore, in the case of a logical channel that is the only logical channel capable of using the configured grant, a regular BSR message may not be triggered. When the only logical channel can use a configured grant, the configured grant may not include a BSR message. In this instance, the configured grant processes only data of a logical channel to be processed, and thus resource efficiency can be improved.

FIG. 1Q illustrates when a regular BSR message is not triggered according to an embodiment. In FIG. 1Q, for example, it is assumed that two logical channels 1q-10 and 1q-20 are configured in a terminal. Whether each logical channel triggers a regular BSR message may be configured by a base station. The embodiment of FIG. 1Q shows whether each logical channel triggers a regular BSR message by a regular BSR prohibit information element (regularBSRprohibit IE). Logical channel 1 (1q-10) does not trigger a regular BSR message because the regularBSRprohibit IE is configured to be true. Logical channel 2 (1q-20) may trigger a regular BSR message because the regularBSRprohibit IE is configured to be false. Even when the regularBSRprohibit IE is not configured, a regular BSR message may not be triggered.

Figure 1R:
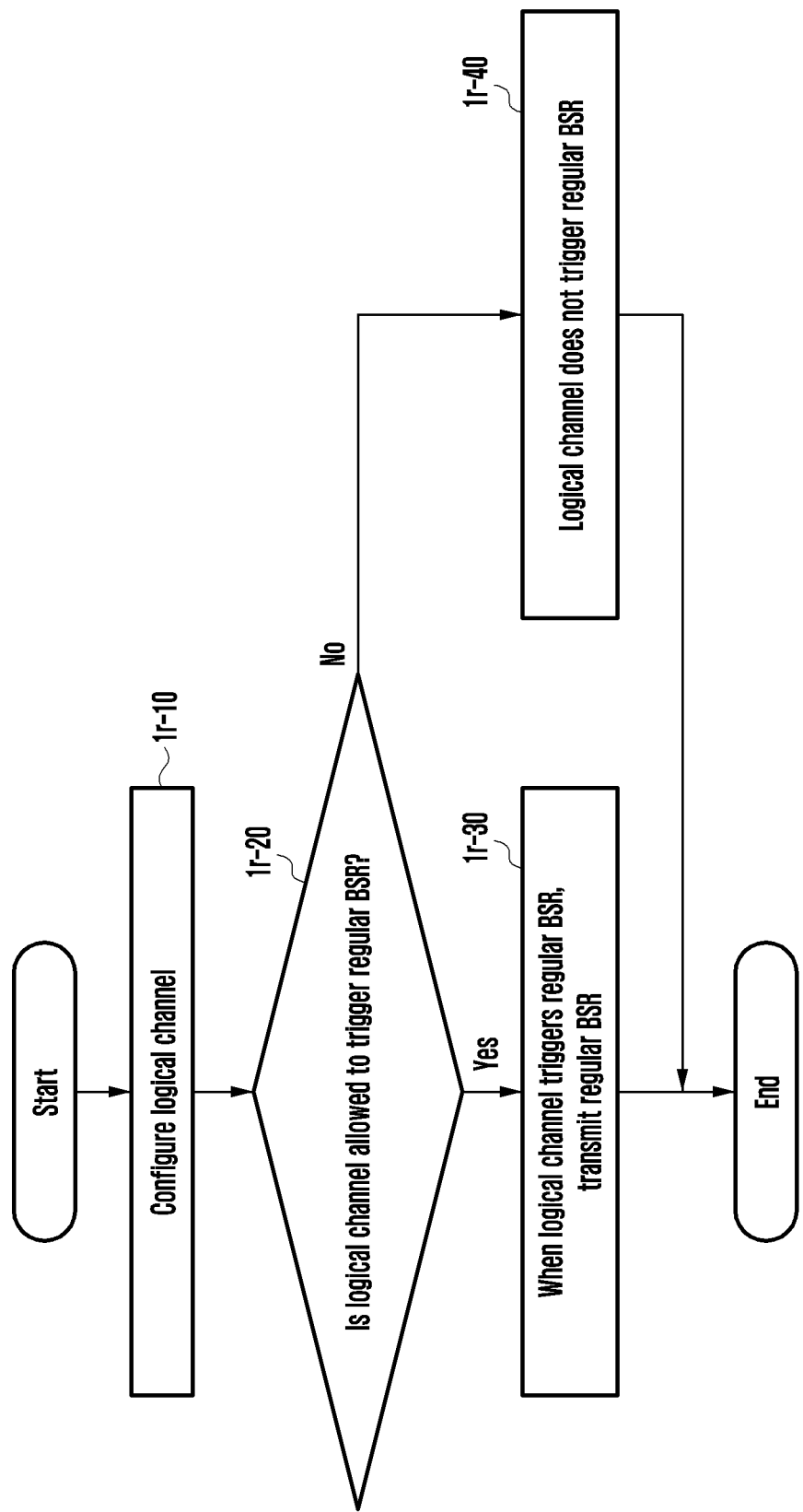
FIG. 1R illustrates when a regular BSR message is not triggered according to an embodiment.

FIG. 1R illustrates when a regular BSR message is not triggered according to an embodiment. In FIG. 1R, when a logical channel is generated in step 1r-10, it is possible to configure whether the logical channel is allowed to trigger a regular BSR message. When the logical channel is allowed to trigger the regular BSR message in step 1r-20, the logical channel triggers normally the regular BSR message. When the regular BSR message is triggered, the regular BSR message may be transmitted in step 1r-30.

When the logical channel is not allowed to trigger the regular BSR message in step 1r-20, the logical channel may not trigger the regular BSR message in step 1r-40. Even when a regular BSR message is triggered, actual transmission of the message may not be performed.

Figure 1S:
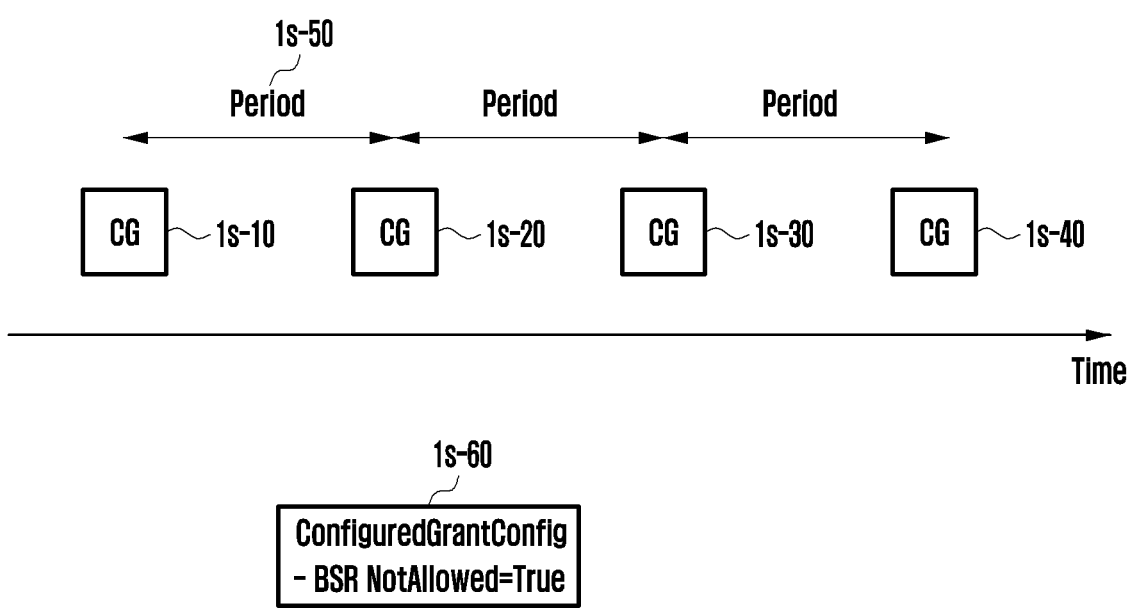
FIG. 1S illustrates a method for configuring a resource in which a BSR message is not transmitted according to an embodiment.

FIG. 1S illustrates a method for configuring a resource in which a BSR message is not transmitted according to an embodiment. The embodiment of FIG. 1S shows that configured grants 1s-10, 1s-20, 1s-30, and 1s-40 are configured to have a predetermined period 1s-50 therebetween. It may be assumed that the configured grants have a fixed traffic pattern or are used for data having a high priority. In this case, including another traffic or MAC CE having a low priority in the configured grants may degrade service quality. Such service quality degradation may be prevented by configuring whether the BSR message can be transmitted in the configured grants when the configured grants are configured or reconfigured.

In the embodiment of FIG. 1S, when configured grants are configured or reconfigured, a BSRNotAllowed information element (BSRNotAllowed IE) may be configured. When a corresponding field is configured to be true, a BSR message may not be transmitted in a corresponding configured grant (1s-60). In another embodiment, when at least one among PeriodicBSRNotAllowed, RegularBSRNotAllowed, and PaddingBSRNotAllowed IE is configured, a periodic BSR message may not be transmitted, a regular BSR message may not be transmitted, or a padding BSR message may not be transmitted. In another embodiment, even when BSRNotAllowed is configured, only a general period BSR message and a general regular BSR message are prohibited from being transmitted, and a padding BSR message may be allowed to be transmitted.

The embodiment of FIG. 1S illustrates an example in which a BSR message is not included in a configured grant. However, the method may be extendedly applied to all MAC CEs. For example, an information element (IE) such as MACCENotAllowed may be configured, and when a corresponding field is configured, the MAC CE may not be allowed to be transmitted to a corresponding configured grant. The above-described configuration may be included in Configured Grant Config message that is transmitted to a base station from a terminal.

Figure 1T:
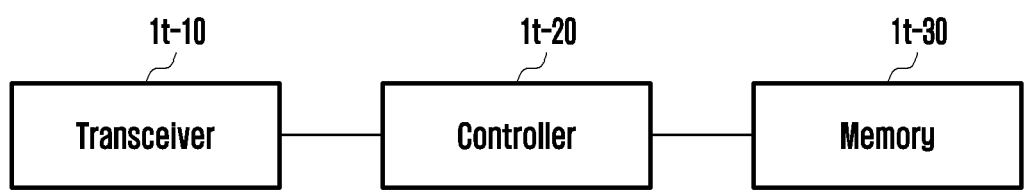
FIG. 1T illustrates illustrate a structure of a terminal according to an embodiment.

FIG. 1T illustrates illustrate a structure of a terminal according to an embodiment.

Referring to FIG. 1T, the terminal may include a transceiver 1t-10, a controller 1t-20, and a memory 1t-30. The controller in the disclosure may be defined as a circuit, an application-specific integrated circuit, or at least one processor.

The transceiver 1t-10 may transmit or receive a signal to or from another network entity. For example, the transceiver 1t-10 may receive system information from a base station, and may also receive a synchronization signal or a reference signal therefrom.

The controller 1t-20 may control the overall operation of the terminal. For example, the controller 1t-20 may control signal flow between blocks so as to perform operations according to the flowcharts described in the Figures herein.

The memory 1t-30 may store at least one of information transmitted or received through the transceiver 1t-10 and information generated by the controller 1t-20.

Figure 1U:
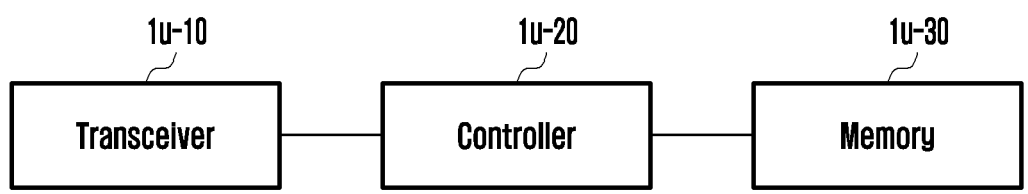
FIG. 1U illustrates a structure of a base station according to an embodiment.

FIG. 1U illustrates a structure of a base station according to an embodiment.

Referring to FIG. 1U, the base station may include a transceiver 1u-10, a controller 1u-20, and a memory 1u-30. The controller 1u-20 in the disclosure may be defined as a circuit, an application-specific integrated circuit, or at least one processor.

The transceiver 1u-10 may transmit or receive a signal to or from another network entity. For example, the transceiver 1u-10 may transmit system information to a terminal, and may also transmit a synchronization signal or a reference signal thereto.

The controller 1u-20 may control the overall operation of the base station. For example, the controller 1u-20 may control signal flow between blocks so as to perform operations according to the flowcharts described in the Figures herein.

The memory 1u-30 may store at least one of information transmitted or received through the transceiver 1u-10 and information generated by the controller 1u-20.

Second Embodiment

Figure 2A:
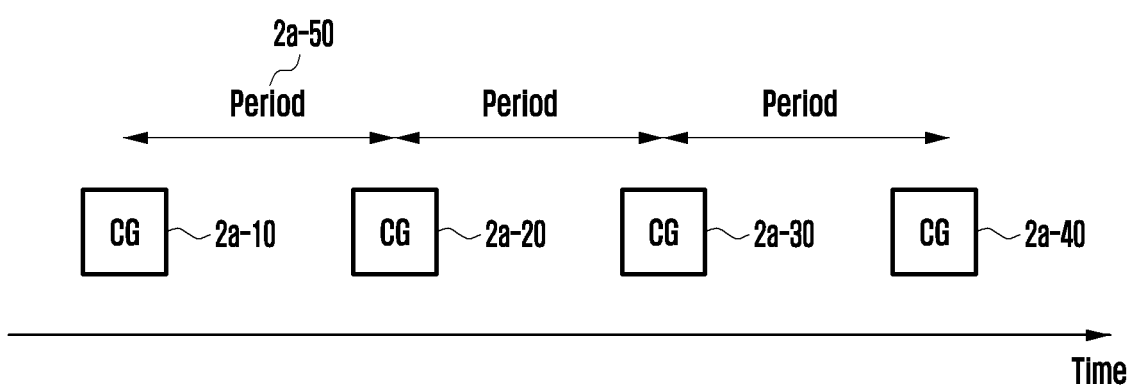
FIG. 2A illustrates an example in which configured grants are configured according to an embodiment.

FIG. 2A illustrates an example in which configured grants are configured according to an embodiment. The embodiment of the FIG. 2A illustrates that configured grants (CG) 2a-10, 2a-20, 2a-30, and 2a-40 are configured to have a predetermined period 2a-50 therebetween. A base station may configure each configured grant for a terminal and may configure a period, a position of a radio resource, a size, a modulation, a coding rate, etc. The configured grants may be activated immediately after being configured or may be activated by a separate activation command.

The configured grants may have a fixed traffic pattern, or may be assumed to be used for data having a high priority. The configured grants may be exclusively allocated to data having a short delay requirement. To this end, the base station may configure, through a radio resource control (RRC) configuration message, whether a terminal can use a specific configured grant for each specific logical channel. Multiple configured grants may be configured for one terminal, in which case a period, a position of a radio resource, a size, a modulation, a coding rate, etc. of each configured grant may all be differently configured.

Figure 2B:
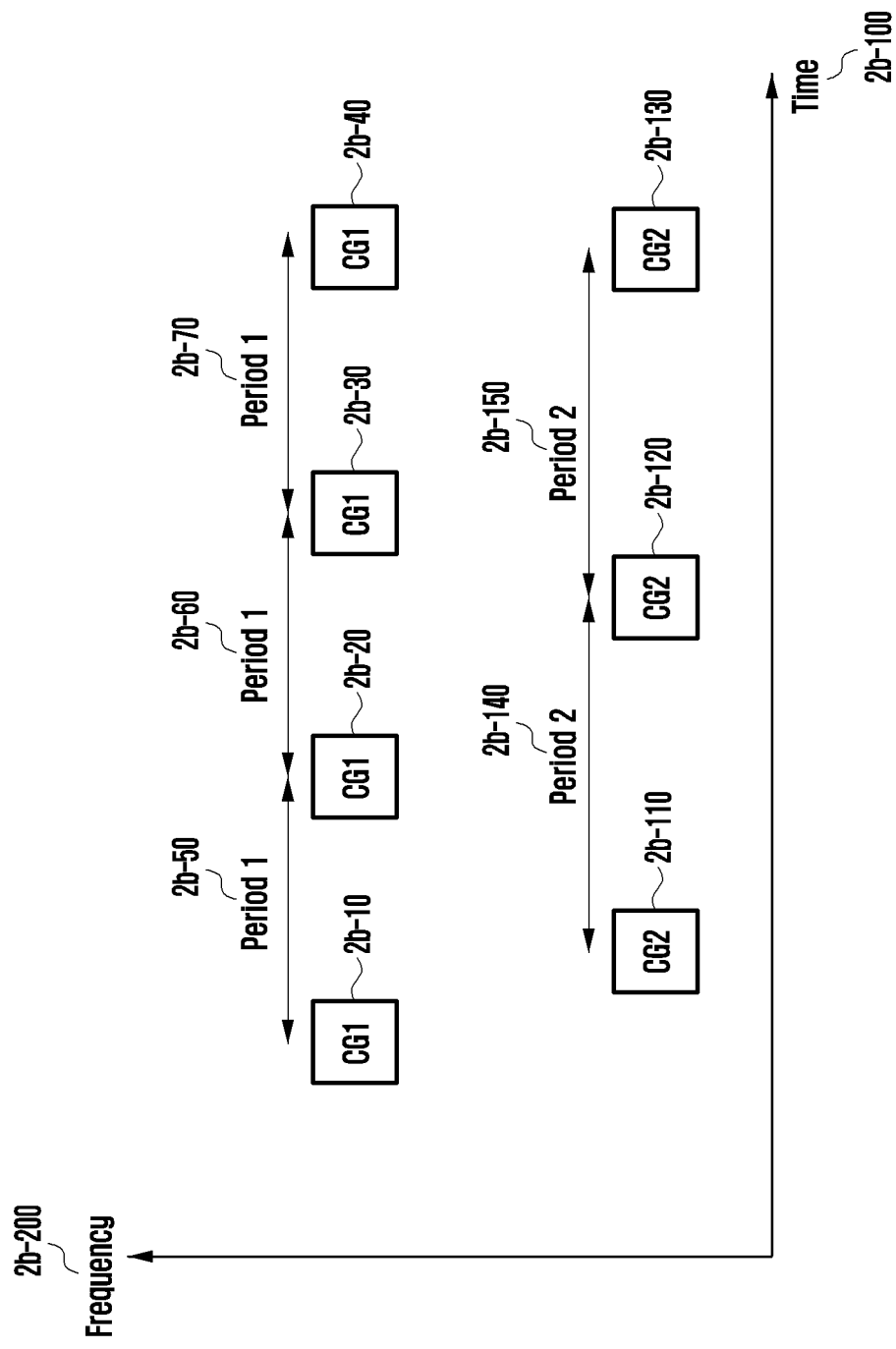
FIG. 2B illustrates an example in which multiple configured grants are configured according to an embodiment.

FIG. 2B illustrates an example in which multiple configured grants are configured according to an embodiment. FIG. 2B illustrates an example of configuring two types of configured grants, i.e., first configured grants (CG1) 2b-10, 2b-20, 2b-30, and 2b-40 and second configured grants (CG2) 2b-110, 2b-120, and 2b-130 However, four or more types of configured grants may be configured.

The configuration of the configured grants different from each other implies that a period, a position of a radio resource, a size, a modulation, a coding rate, etc. of each configured grant have been separately configured according to the specific configuration of the grant. The position of a radio resource may be configured discriminately according to a time axis 2b-100 and a frequency axis 2b-200. The configuration of multiple configured grants as described above may be performed to enable the configured grants to process data having different requirements. In this case, a base station may configure a logical channel that can be transmitted using each configured grant.

Figure 2C:
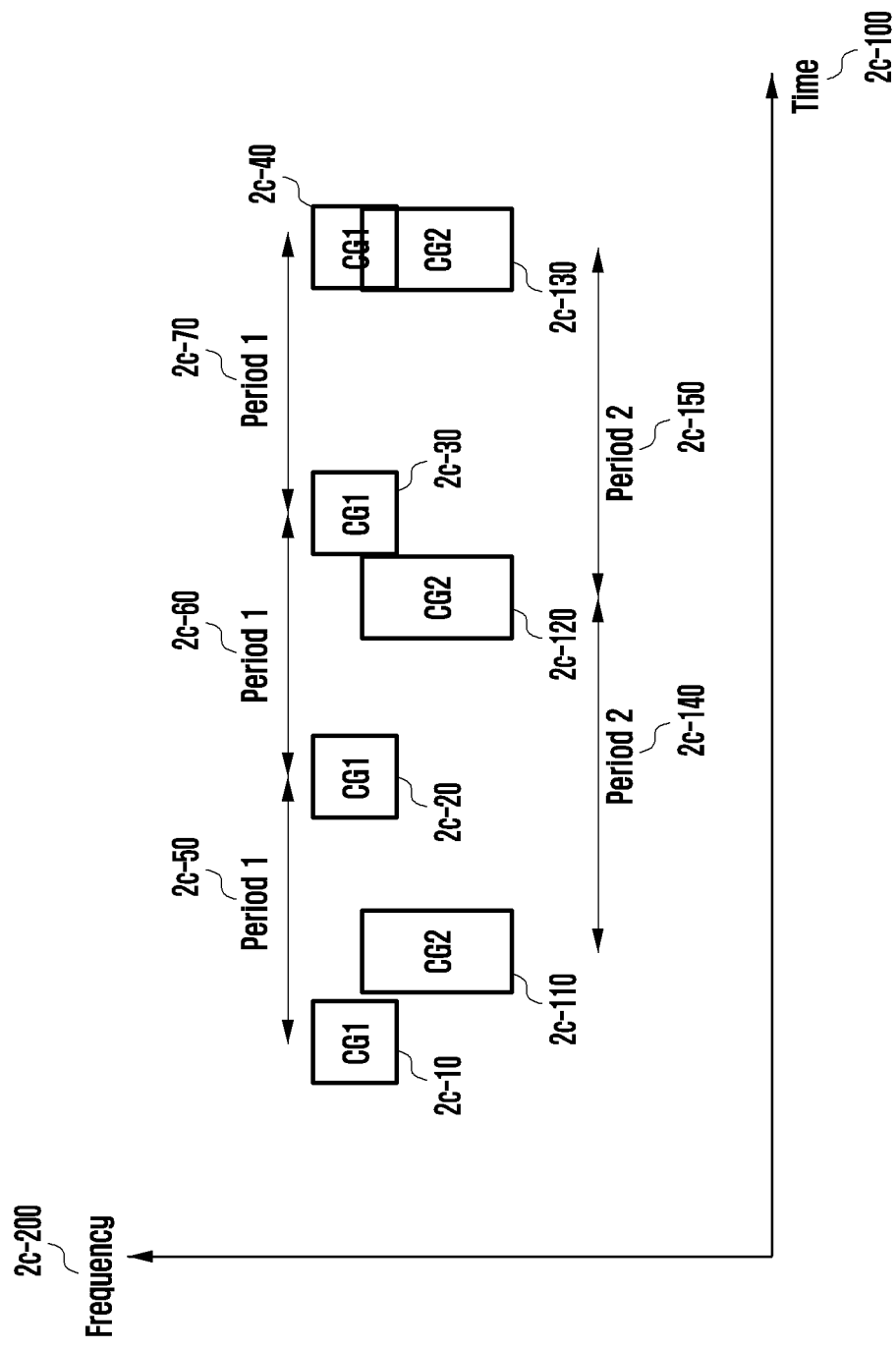
FIG. 2C illustrates an example in which multiple configured grants overlap each other according to an embodiment.

FIG. 2C illustrates an example in which multiple configured grants overlap each other according to an embodiment. The embodiment of FIG. 2C illustrates an example of configuring two types of configured grants, i.e., first configured grants (CG1) 2c-10, 2c-20, 2c-30, and 2c-40 and second configured grants (CG2) 2c-110, 2c-120, and 2c-130.

However, three or more types of configured grants may be configured. The configuration of the configured grants different from each other implies that a period, a position of a radio resource, a size, a modulation, a coding rate, etc. of the configured grants have been separately configured according to the specific configuration of the grant.

The position of a radio resource may be configured discriminately according to a time axis 2c-100 and a frequency axis 2c-200. The configuration of multiple configured grants as described above may be performed to enable the configured grants to process data having different requirements. In this case, a base station may configure a logical channel that can be transmitted using each configured grant, periods (2c-50, 2c-60, and 2c-70) of the first configured grants are different from periods (2c-140 and 2c-150) of the second configured grants, and allocated resources overlap each other on the frequency axis. Thus, the first configured grants (2c-40) may overlap the second configured grants (2c-130). Therefore, how a terminal processes the overlapping part may become a problem. For example, the first configured grants (2c-40) may overlap at least part of the second configured grants (2c-130).

In this instance, the terminal may select one of two configured grants and may perform transmission corresponding to the selected configured grant. For example, the terminal may perform transmission corresponding to the first configured grant 2c-40 under preconfigured conditions and may not perform transmission corresponding to the second configured grant 2c-130. The terminal may perform, under preconfigured conditions, transmission corresponding the first configured grant 2c-40 with respect to only the part at which resources overlap each other, and may perform normal transmission corresponding to the second configured grant with respect to a second configured grant 2c-130 part at which the resources do not overlap each other Which configured grant is selected may be determined by a relative priority configured in advance for each configured grant or may be determined according to the type or volume of data stored in the terminal.

Figure 2D:
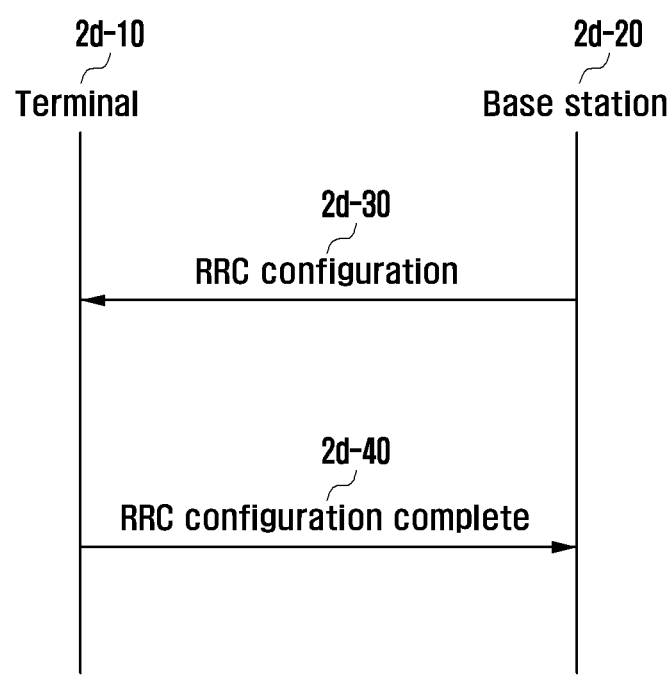
FIG. 2D illustrates an operation of configuring a configured grant according to an embodiment.

FIG. 2D illustrates an operation of configuring a configured grant according to an embodiment. In FIG. 2D, a terminal 2d-10 may receive configuration for a configured grant from a base station 2d-20. The configuration may be performed by an RRC configuration message 2d-30 which the base station transmits to the terminal. The configuration message may include a configured grant configuration information element (configured grant configuration IE). Each configured grant configuration IE may configure a period, a position of a radio resource, a size, a modulation, a coding rate, whether to use a separate activation, etc. of the configured grant.

When multiple configured grant configuration IEs are received, the terminal may have multiple configured grants. On the basis thereof, the configured grant transmission operations described with reference to FIGS. 2A, 2B, and 2C may be performed. When the terminal has successfully received the RRC configuration message 2d-30 and is completely configured, the terminal may transmit an RRC configuration completion message 2d-40 to the base station, thereby notifying the base station of completion of configuration of the terminal.

FIG. 2E illustrates a configured grant priority configuration method according to an embodiment. In FIG. 2E, when a terminal receives configured grant configuration IEs 2e-10 and 2e-20 from a base station as illustrated in FIG. 2D, configured grants may be configured. In the embodiment of FIG. 2E, it is assumed that two configured grants are configured by two configured grant configuration IEs 2e-10 and 2e-20. However, the disclosure may be applied to when three or more configured grants are configured.

Each configured grant may have a priority allocated thereto. A priority value of 1 is allocated to a configured grant corresponding to a first configured grant configuration 2e-10, and a priority value of 2 is allocated to a configured grant corresponding to a second configured grant configuration 2e-20, as illustrated. Normally, it may be understood that a priority increases as a priority value decreases. However, it may be understood that a priority increases as a priority value increases.

The priorities of the configured grants may be used when the configured grant resources illustrated in FIG. 2C overlap each other. When the first configured grant overlaps the second configured grant, the terminal may determine, using priorities, which configured grant is used. Specifically, when the priority of the first configured grant is higher than that of the second configured grant, the first configured grant may be used. In the embodiment of FIG. 2E, the first configured grant may be construed to have a lower priority value and thus have a higher priority, and therefore the first configured grant may be used.

Figure 2F:
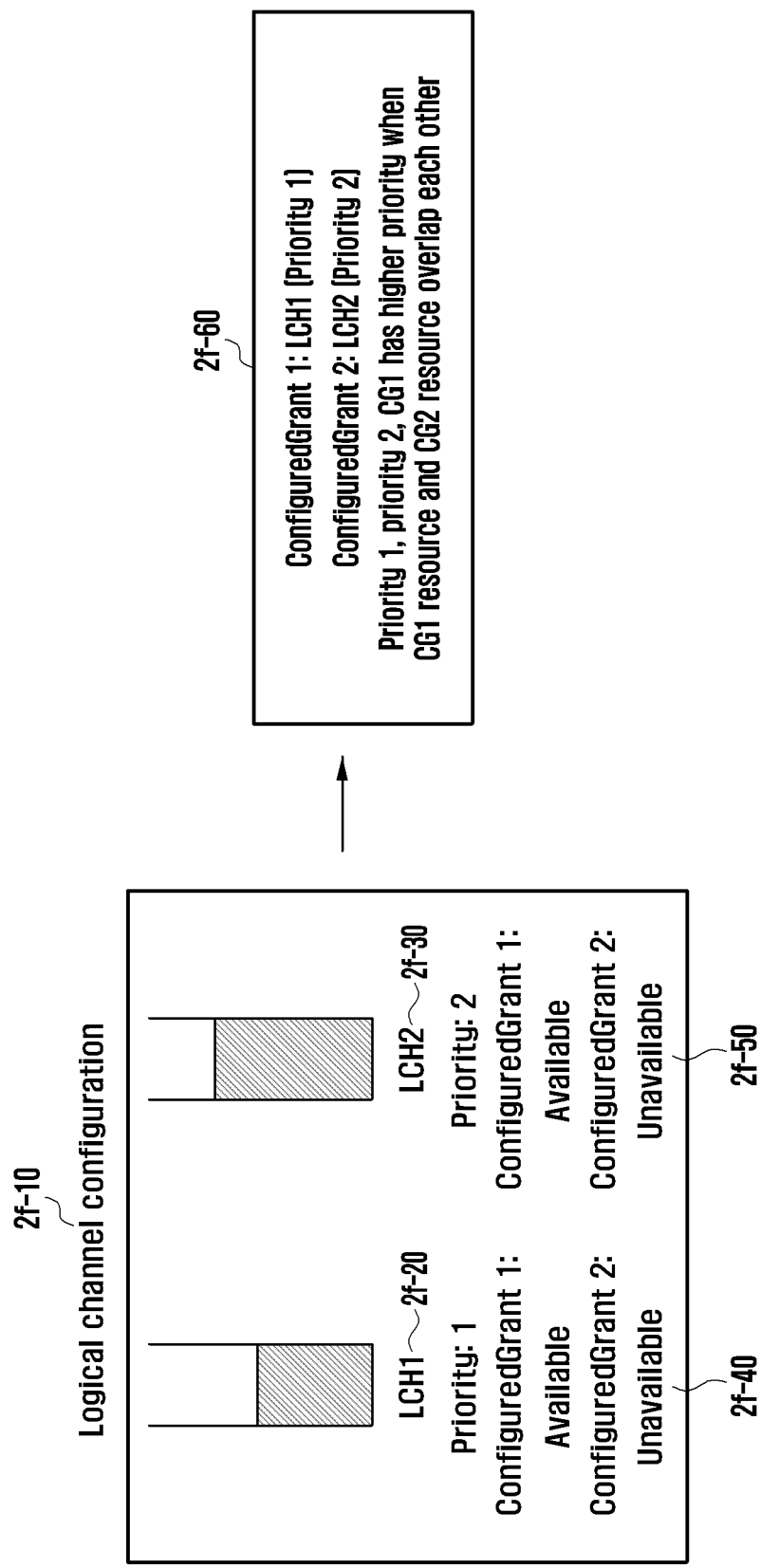
FIG. 2F illustrates a configured grant priority configuration method according to an embodiment.

FIG. 2F illustrates a configured grant priority configuration method according to an embodiment. In FIG. 2F, when a terminal receives configured grant configuration IEs 2e-10 and 2e-20 from a base station as illustrated in FIG. 2E, configured grants may be configured. A logical channel may be configured by a logical channel configuration IE 2f-10. As in the embodiment of FIG. 2E, the embodiment of FIG. 2F assumes that two configured grants are configured. However, the disclosure may be applied to when three or more configured grants are configured.

The embodiment of FIG. 2F shows the case in which a priority is not separately allocated to each configured grant but the priority of the configured grant is allocated by the priority of a logical channel capable of using the configured grant. The embodiment of FIG. 2F assumes that two logical channels, i.e., logical channel 1 (LCH1) 2f-20 and logical channel 2 (LCH2) 2f-30, are configured for the terminal. It is assumed that logical channel 1 has a priority value set to 1, and a first configured grant can be used but a second configured grant cannot be used (2f-40). It is assumed that logical channel 2 has a priority value set to 2, and the first configured grant can be used and the second configured grant cannot be used (2f-50).

Through this, priorities of configured grants can be determined. The first configured grant has a priority of 1 which is a priority value of logical channel 1 that is capable of using a corresponding resource, and the second configured grant has a priority of 2 which is a priority value of logical channel 2 that is capable of using a corresponding resource. Therefore, when resources of the first configured grant and the second configured grant overlap each other, the first configured grant, which is a higher-priority configured grant, may be used (2f-60).

FIG. 2G illustrates a configured grant priority configuration method according to an embodiment. In FIG. 2G, when a terminal receives configured grant configuration IEs 2e-10 and 2e-20 from a base station as illustrated in FIG. 2E, configured grants may be configured. The embodiment of FIG. 2G assumes that two configured grants are configured by two configured grant configuration IEs 2g-10 and 2g-20. However, the disclosure may be applied to when three or more configured grants are configured.

The embodiment of FIG. 2G shows the case in which a priority is not separately allocated to each configured grant but the priority of the configured grant is allocated by the period of the configured grant. A configured grant corresponding to a first configured grant configuration 2g-10 has a period of 100 ms and a configured grant corresponding to a second configured grant configuration 2g-20 has a period of 200 ms. In this instance, a higher priority may be applied to a configured grant having a shorter period. However, in another embodiment, a higher priority may be applied to a configured grant having a longer period.

The embodiment of FIG. 2G is characterized in that the length of a period can affect the priorities of the configured grants. The priorities of the configured grants may be used when the configured grant resources illustrated in FIG. 2C overlap each other. When a first configured grant resource and a second configured grant resource overlap each other, the terminal may determine, according to the priorities of configured grants, which configured grant is used.

Specifically, when the priority of the first configured grant is higher than that of the second configured grant, the first configured grant may be used. In the embodiment of FIG. 2G, the first configured grant may be construed to have a lower priority value and thus have a higher priority, and therefore, the first configured grant may be used.

Figure 2H:
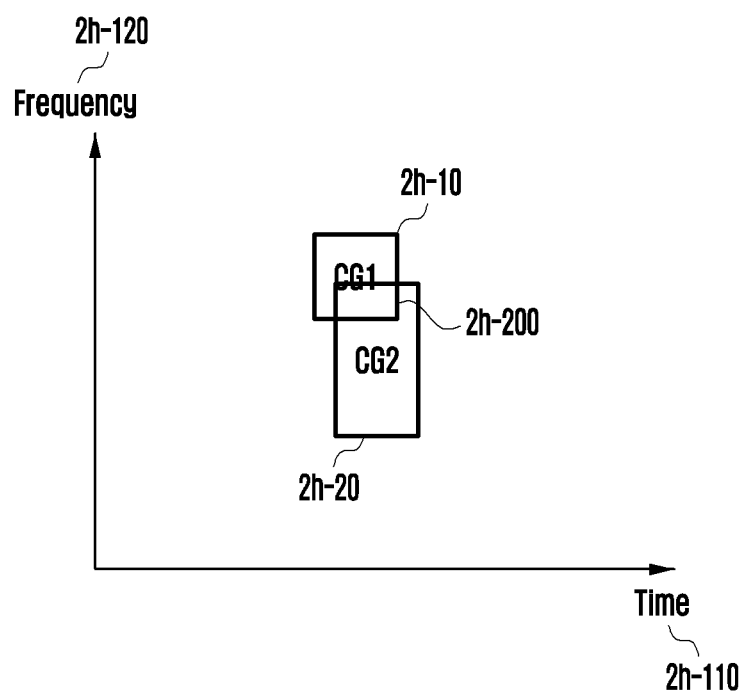
FIG. 2H illustrates a configured grant priority configuration method according to an embodiment.

FIG. 2H illustrates a configured grant priority configuration method according to an embodiment. FIG. 2H illustrates an example in which two configured grants, i.e., a first configured grant (CG1) 2h-10 and a second configured grant (CG2) 2h-20, are configured. However, it is possible to configure three or more configured grants. The configuration of the configured grants different from each other implies that a period, a position of a radio resource, a size, a modulation, a coding rate, etc. of each configured grant have been separately configured according to the specific configuration of the grant.

The position of a radio resource may be configured discriminately according to a time axis 2h-110 and a frequency axis 2h-120. The configuration of multiple configured grants as described above may be performed to enable the configured grants to process data having different requirements. In this case, a base station may configure a logical channel that can be transmitted using each configured grant. Since the period of the first configured grant and the period of the second configured grant are different from each other and allocated resources overlap each other in the frequency axis, the first configured grant and the second configured grant may overlap each other, as illustrated at 2h-200. In this case, how a terminal processes an overlapping part may be a problem.

The embodiment of FIG. 2H shows a method in which a configured grant having an earlier start time point among the configured grants overlapping each other has a higher priority. Among the first configured grant 2h-10 and the second configured grant, which have an overlapping resource 2h-200, the first configured grant 2h-10 has an earlier start time point. Thus, the terminal may select and transmit the first configured grant. The terminal may also transmit the remaining part of the second configured grant 2h-20, which does not correspond to the part 2h-200 at which the second configured grant overlaps the first configured grant. However, the remaining part is not necessarily required to be transmitted, and may not be used by the terminal.

In another embodiment, among the configured grants having the overlapping resources 2h-200, a configured grant having an earlier end time point may be configured to be used, or a smaller or larger configured grant may be configured to be used.

Figure 2I:
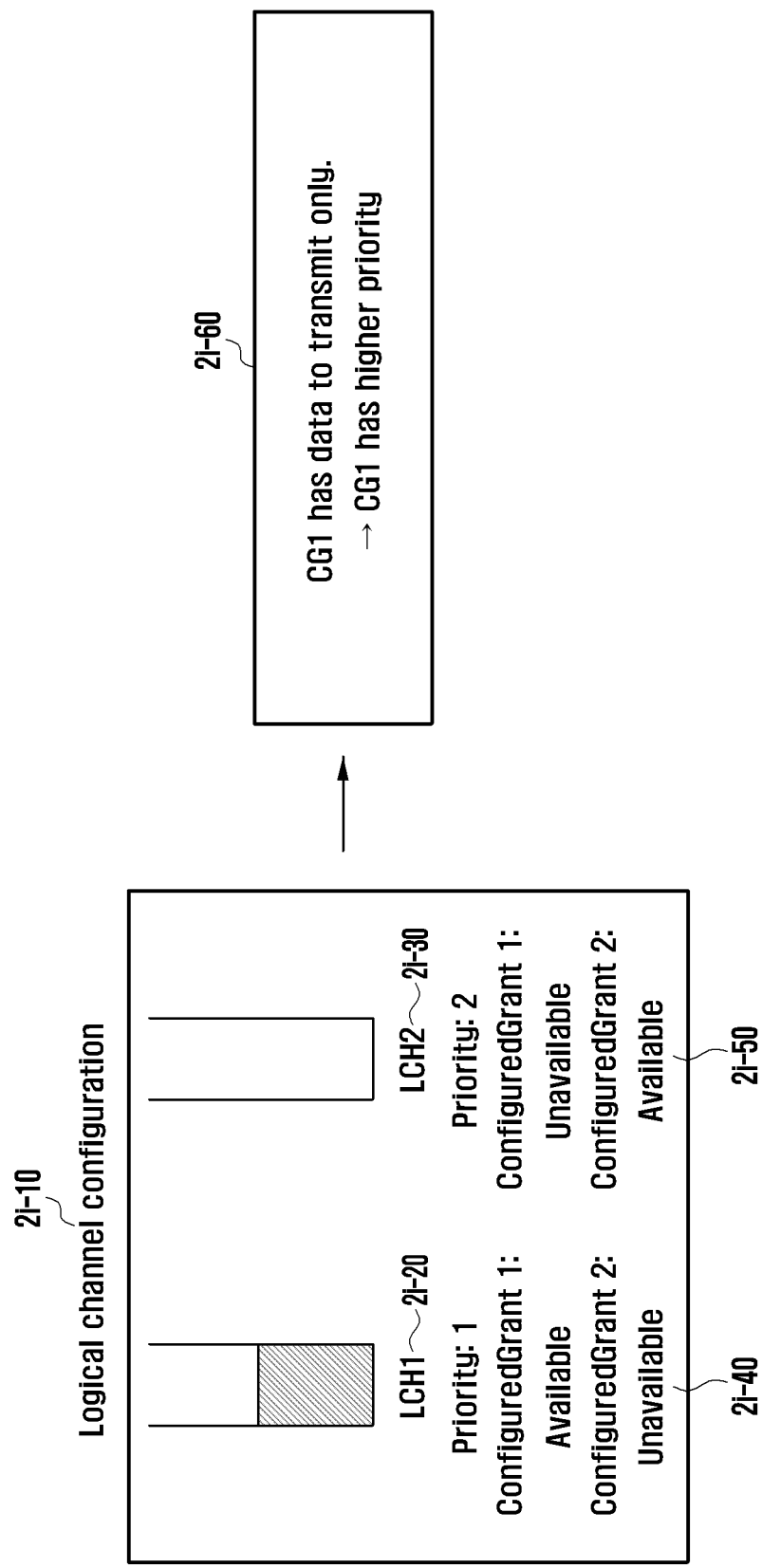
FIG. 2I illustrates a configured grant priority configuration method according to an embodiment.

FIG. 2I illustrates a configured grant priority configuration method according to an embodiment. In FIG. 2I, when a terminal receives configured grant configuration IEs 2e-10 and 2e-20 from a base station as illustrated in FIG. 2E, configured grants may be configured. A logical channel may be configured by a logical channel configuration IE 2i-10. As in the embodiment of FIG. 2E, the embodiment of FIG. 2I assumes that two configured grants are configured. However, the disclosure may be applied to when three or more configured grants are configured.

The embodiment of FIG. 2I shows the case in which a priority is not separately allocated to each configured grant but the priority of the configured grant is allocated by the priority of a logical channel capable of using the configured grant. The embodiment of FIG. 2I assumes that two logical channels, i.e., logical channel 1 (LCH1) 2i-20 and logical channel 2 (LCH2) 2i-30, are configured for the terminal.

It is assumed that logical channel 1 has a priority value set to 1, and that a first configured grant can be used but a second configured grant cannot be used (2i-40). It is assumed that logical channel 2 has a priority value set to 2, and that the first configured grant cannot be used and the second configured grant can be used (2i-50). When resources of the first configured grant and the second configured grant overlap each other, a configured grant having data to be transmitted has a higher priority and may perform data transmission.

In the embodiment of FIG. 2I, logical channel 1 (2i-20) has data D1 to be transmitted but logical channel 2 (2i-30) has no data to be transmitted. In this instance, the first configured grant through which the data of logical channel 1 can be transmitted has a higher priority and may perform data transmission (2i-60). When both the first configured grant and the second configured grant have data to be transmitted, data transmission may be transmitted based on a preconfigured rule. The preconfigured rule may be one of the methods described in the embodiments of FIGS. 2E, 2F, 2G, and 2H.

Figure 2J:
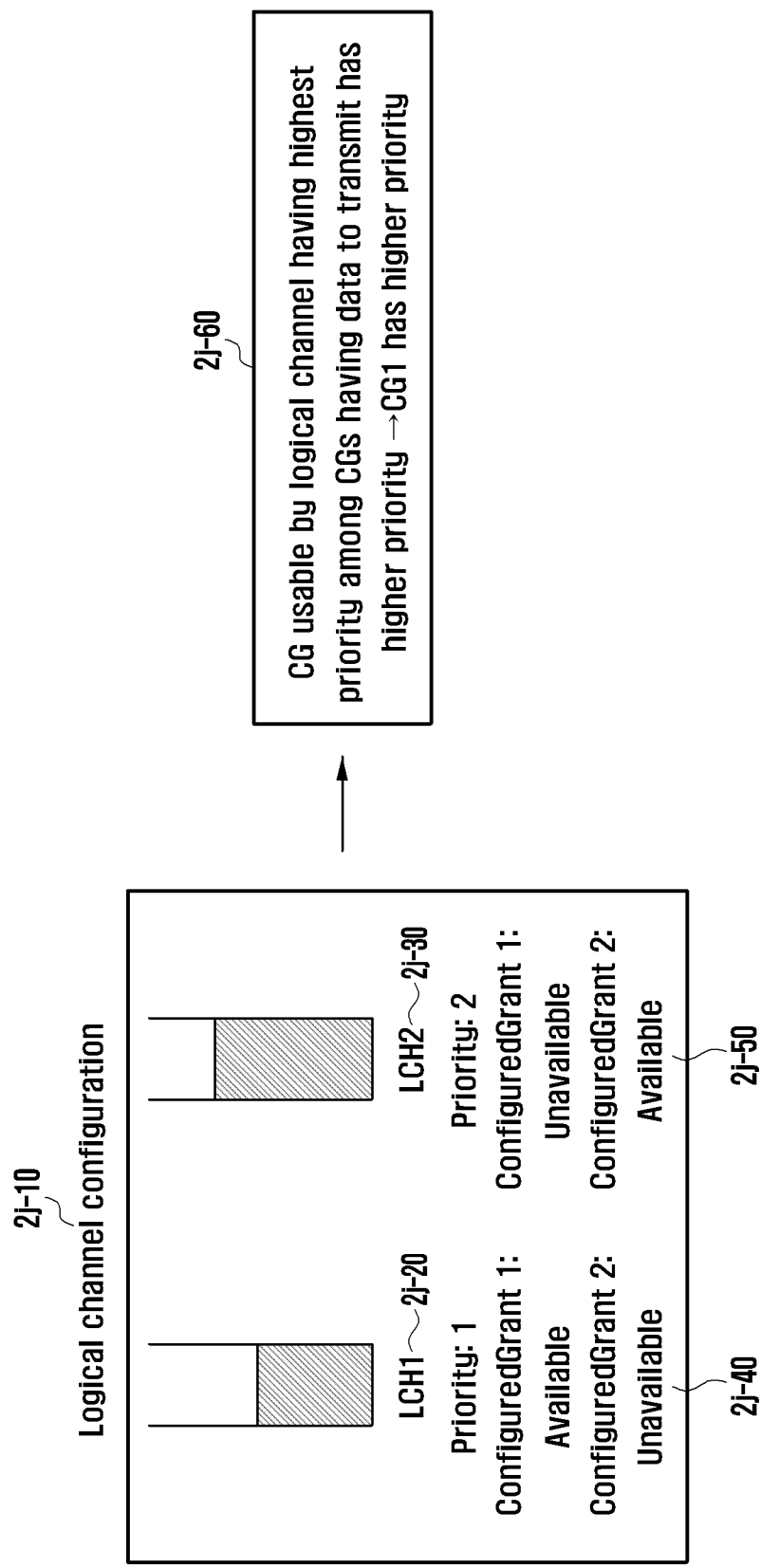
FIG. 2J illustrates a configured grant priority configuration method according to an embodiment.

FIG. 2J illustrates a configured grant priority configuration method according to an embodiment. When a terminal receives configured grant configuration IEs 2e-10 and 2e-20 from a base station as illustrated in FIG. 2E, configured grants may be configured. A logical channel may be configured by a logical channel configuration IE 2j-10. As in the embodiment of FIG. 2E, the embodiment of FIG. 2J assumes that two configured grants are configured. However, the disclosure may be applied to when three or more configured grants are configured.

The embodiment of FIG. 2J shows the case in which a priority is not separately allocated to each configured grant but the priority of the configured grant is allocated by the priority of a logical channel capable of using the configured grant. The embodiment of FIG. 2J assumes that two logical channels, i.e., logical channel 1 (LCH1) 2j-20 and logical channel 2 (LCH2) 2j-30, are configured for the terminal.

It is assumed that logical channel 1 has a priority value set to 1, and that a first configured grant can be used but a second configured grant cannot be used (2j-40). It is assumed that logical channel 2 has a priority value set to 2, and that the first configured grant cannot be used and the second configured grant can be used (2j-50).

In this instance, when resources of the first configured grant and the second configured grant overlap each other, the first configured grant or the second configured grant, which has data to be transmitted and can be used by a logical channel having the highest priority, has a higher priority and may perform data transmission (2i-60).

In the embodiment of FIG. 2J, since both logical channel 1 (2j-20) and logical channel 2 (2j-30) have data D1, D2 to be transmitted, both the first configured grant and the second configured grant have data to be transmitted. In this instance, since the priority of logical channel 1 is higher than that of the logical channel 2, the first configured grant transmittable by the logical channel 1 has a higher priority and may perform data transmission of data D1 (2j-60).

Figure 2K:
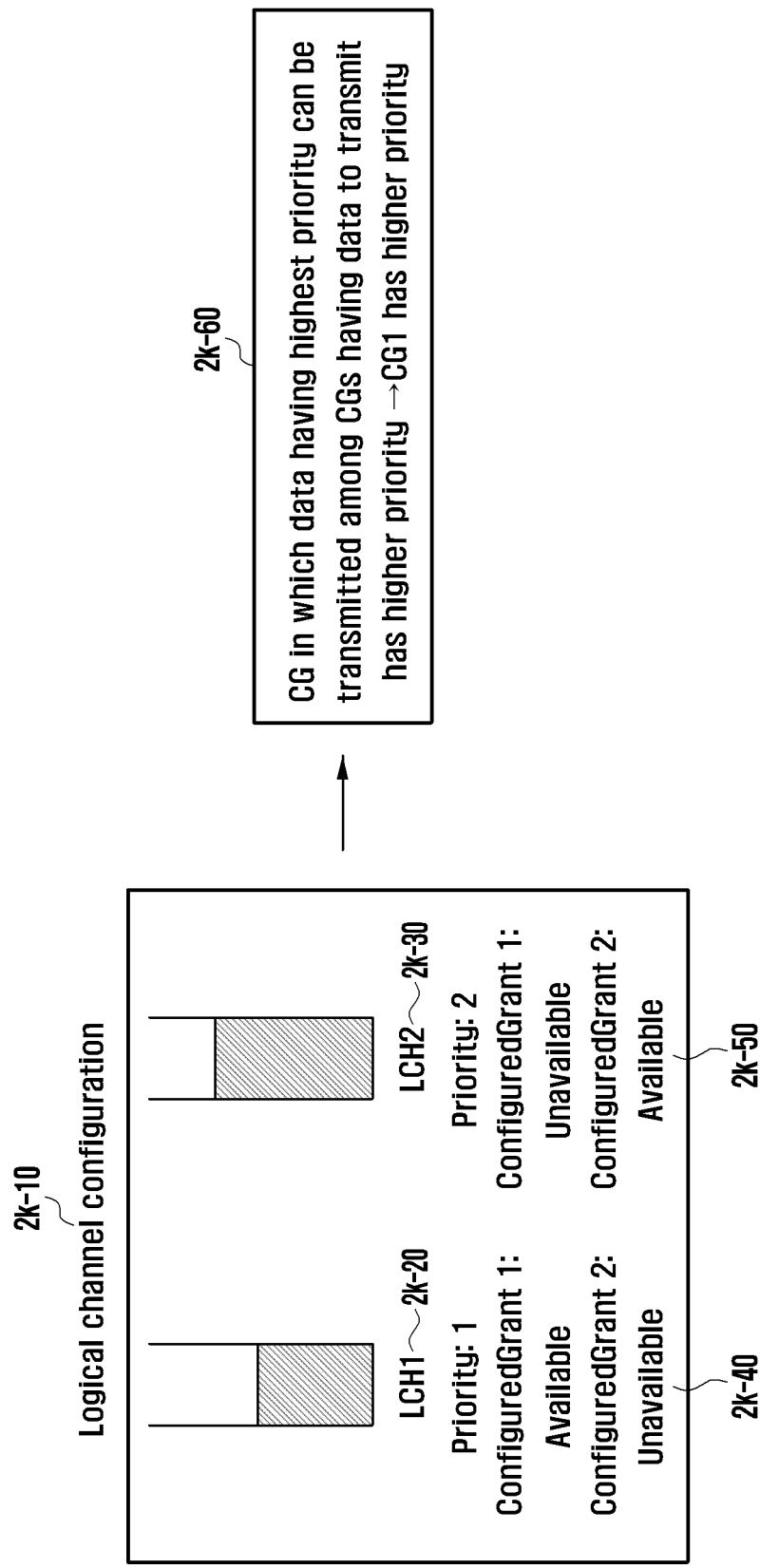
FIG. 2K illustrates a configured grant priority configuration method according to an embodiment.

FIG. 2K illustrates a configured grant priority configuration method according to an embodiment. In FIG. 2K, when a terminal receives configured grant configuration IEs 2e-10 and 2e-20 from a base station as illustrated in FIG. 2E, configured grants may be configured. A logical channel may be configured by a logical channel configuration IE 2k-10. As in the embodiment of FIG. 2E, the embodiment of FIG. 2K assumes that two configured grants are configured. However, the disclosure may be applied to when three or more configured grants are configured.

The embodiment of FIG. 2K shows the case in which a priority is not separately allocated to each configured grant but the priority of the configured grant is allocated by the priority of a logical channel capable of using the configured grant. The embodiment of FIG. 2K assumes that two logical channels, i.e., logical channel 1 (LCH1) 2k-20 and logical channel 2 (LCH2) 2k-30 are configured for the terminal.

It is assumed that logical channel 1 has a priority value set to 1, and that a first configured grant can be used but a second configured grant cannot be used (2k-40). It is assumed that logical channel 2 has a priority value set to 2, and that the first configured grant cannot be used and the second configured grant can be used (2k-50).

In this instance, when resources of the first configured grant and the second configured grant overlap each other, a configured grant, in which data having the highest priority can be sent, has a higher priority and may perform data transmission (2k-60). In the embodiment of FIG. 2K, since both logical channel 1 (2k-20) and logical channel 2 (2k-30) have data to be transmitted, the first configured grant, through which logical channel having data having the highest priority can be transmitted, has a higher priority and may perform data transmission (2k-60) of the data D1.

Figure 2L:
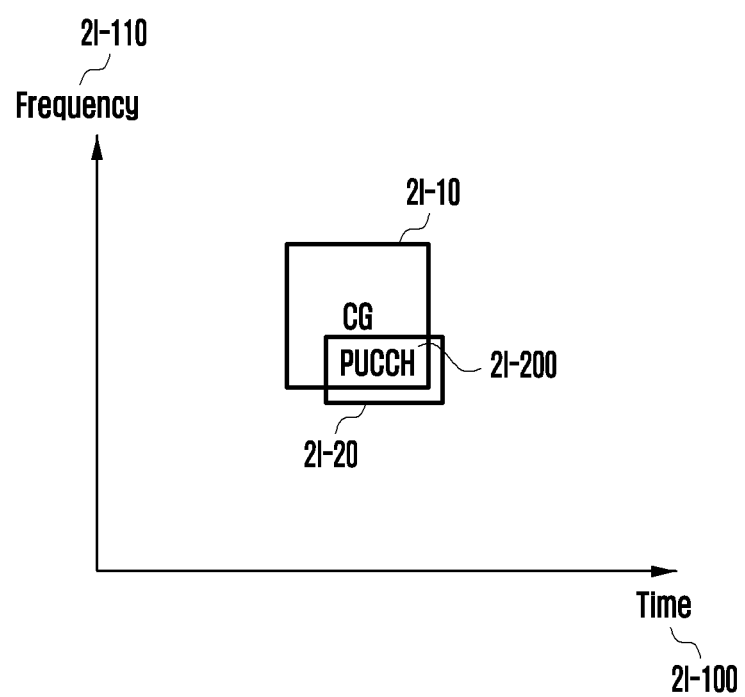
FIG. 2L illustrates a method for configuring priority between a configured grant and an uplink control channel according to an embodiment.

FIG. 2L illustrates a method for configuring priority between a configured grant and a physical uplink control channel (PUCCH) according to an embodiment. In FIG. 2L, a configured grant configured for a terminal by a base station may be used when the terminal has data to transmit, and when there is no data to be transmitted, the terminal may skip transmission without using the configured grant.

Similarly, in the case of a PUCCH that the terminal transmits to the base station, the terminal may use the PUCCH when the terminal has control channel data to transmit to the base station, and may not use the PUCCH when the terminal has no data to transmit. Therefore, according to a configuration made by the base station, a configured grant resource 2l-10 may be configured to overlap a PUCCH resource 2l-20 on a time 2l-110 axis and a frequency 2l-110 axis as indicated at 2l-200. When the configured grant resource and the PUCCH resource overlap each other, it is necessary to determine the priority between the resources by at least one method among the following embodiments:

A resource having data to transmit has a higher priority.
A resource having data to transmit has a higher priority. When both a configured grant and a PUCCH have data to transmit, the configured grant has a higher priority.
A resource having data to transmit has a higher priority. When both a configured grant and a PUCCH have data to transmit, the PUCCH has a higher priority.

A configured grant has a higher priority than a PUCCH regardless of whether there is data to transmit.

A PUCCH has a higher priority than a configured grant regardless of whether there is data to transmit.

A configured grant configured to have a higher priority than a PUCCH has a higher priority than the PUCCH. Other configured grants have lower priority than the PUCCH.

A configured grant configured to have a lower priority than a PUCCH has a lower priority than the PUCCH. Other configured grants have higher priority than the PUCCH.

Figure 2M:
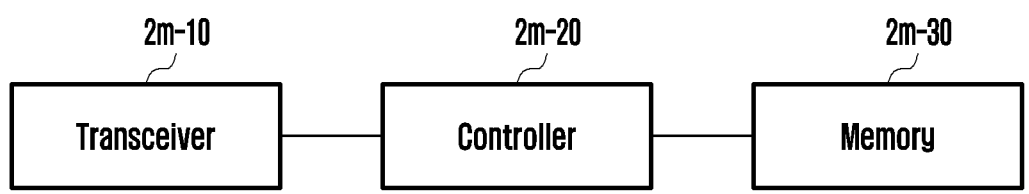
FIG. 2M illustrates a structure of a terminal according to an embodiment.

FIG. 2M illustrates a structure of a terminal according to an embodiment.

Referring to FIG. 2M, the terminal may include a transceiver 2m-10, a controller 2m-20, and a memory 2m-30. The controller in the disclosure may be defined as a circuit, an application-specific integrated circuit, or at least one processor.

The transceiver 2m-10 may transmit or receive a signal to or from another network entity. For example, the transceiver 2m-10 may receive system information from a base station, and may also receive a synchronization signal or a reference signal from the base station.

The controller 2m-20 may control the overall operation of the terminal. For example, the controller 2m-20 may control signal flow between blocks so as to perform operations according to the flowcharts described in the Figures herein.

The memory 2m-30 may store at least one of information transmitted or received through the transceiver 2m-10 and information generated by the controller 2m-20.

Figure 2N:
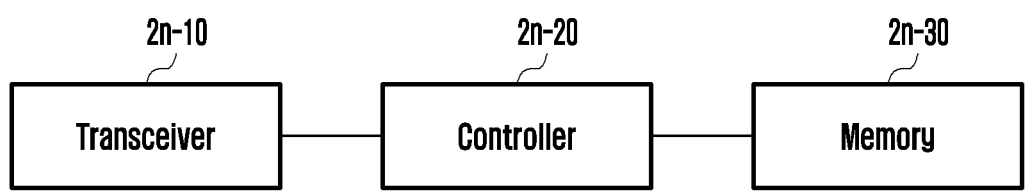
FIG. 2N illustrates a structure of a base station according to an embodiment.

FIG. 2N illustrates a structure of a base station according to an embodiment. Referring to FIG. 2N, the base station may include a transceiver 2n-10, a controller 2n-20, and a memory 2n-30. The controller 2n-20 in the disclosure may be defined as a circuit, an application-specific integrated circuit, or at least one processor.

The transceiver 2n-10 may transmit or receive a signal to or from another network entity. For example, the transceiver 2n-10 may transmit system information to a terminal, and may also transmit a synchronization signal or a reference signal to the terminal.

The controller 2n-20 may control the overall operation of the base station. For example, the controller 2n-20 may control signal flow between blocks so as to perform operations according to the flowcharts described in the Figures herein.

The memory 2n-30 may store at least one of information transmitted or received through the transceiver 2n-10 and information generated by the controller 2n-20.

While the present disclosure has been shown and described with reference to certain embodiments thereof, it will be apparent to those skilled in the art that the camera lens module according to the present disclosure is not limited to these embodiments, and various changes in form and details may be made therein without departing from the scope of the present disclosure as defined by the appended claims and their equivalents.

What is claimed is:

1. A method performed by a terminal in a wireless communication system, the method comprising:
   receiving, from a base station, through radio resource control (RRC) signaling, information for configuring a first configured grant (CG) and a second CG, and configuration information including information on a first logical channel and information on a second logical channel, wherein the information on the first logical channel includes information on a priority of the first logical channel and first information indicating that the first CG is allowed for the first logical channel, and the information on the second logical channel includes information on a priority of the second logical channel and second information indicating that the second CG is allowed for the second logical channel;
   identifying a mapping between the first logical channel and the first CG based on the first information and a mapping between the second logical channel and the second CG based on the second information;
   identifying that resources of the first CG to which data from the first logical channel is mapped and the second CG to which data from the second logical channel is mapped are overlapped; and
   transmitting, to the base station, data based on the first CG, in case that the priority of the first logical channel is higher than the priority of the second logical channel,
   wherein, in case that the information on the first logical channel does not include third information indicating that the second CG is allowed for the first logical channel, the data from the first logical channel is not mapped to the second CG.

2. The method of claim 1, wherein a priority for the first CG is determined based on the priority of the first logical channel, and
   wherein a priority for the second CG is determined based on the priority of the second logical channel.

3. The method of claim 1, wherein the first logical channel and the second logical channel have data to be transmitted.

4. A method performed by a base station in a wireless communication system, the method comprising:
   transmitting, to a terminal, through radio resource control (RRC) signaling, information for configuring a first configured grant (CG) and a second CG, and configuration information including information on a first logical channel and information on a second logical channel, wherein the information on the first logical channel includes information on a priority of the first logical channel and first information indicating that the first CG is allowed for the first logical channel, and the information on the second logical channel includes information on a priority of the second logical channel and second information indicating that the second CG is allowed for the second logical channel; and
   receiving, from the terminal, data based on the first CG, in case that resources of the first CG and the second CG are overlapped, and the priority of the first logical channel is higher than the priority of the second logical channel,
   wherein data from the first logical channel is mapped to the first CG based on the first information and data from the second logical channel is mapped to the second CG based on the second information, and
   wherein, in case that the information on the first logical channel does not include third information indicating that the second CG is allowed for the first logical channel, the data from the first logical channel is not mapped to the second CG.

5. The method of claim 4, wherein a priority for the first CG is based on the priority of the first logical channel, and
   wherein a priority for the second CG is based on the priority of the second logical channel.

6. The method of claim 4, wherein the first logical channel and the second logical channel have data to be transmitted.

7. A terminal in a wireless communication system, the terminal comprising:

a transceiver; and a processor configured to:

receive, via the transceiver from a base station, through radio resource control (RRC) signaling, information for configuring a first configured grant (CG) and a second CG, and configuration information including information on a first logical channel and information on a second logical channel, wherein the information on the first logical channel includes information on a priority of the first logical channel and first information indicating that the first CG is allowed for the first logical channel, and the information on the second logical channel includes information on a priority of the second logical channel and second information indicating that the second CG is allowed for the second logical channel, identify a mapping between the first logical channel and that the first CG based on the first information and a mapping between the second logical channel and the second CG based on the second information, identify that resources of the first CG to which data from the first logical channel is mapped and the second CG to which data from the second logical channel is mapped are overlapped, and transmit, via the transceiver to the base station, data based on the first CG, in case that the priority of the first logical channel is higher than the priority of the second logical channel, wherein, in case that the information on the first logical channel does not include third information indicating that the second CG is allowed for the first logical channel, the data from the first logical channel is not mapped to the second CG.

8. The terminal of claim 7, wherein a priority for the first CG is determined based on the priority of the first logical channel, and wherein a priority for the second CG is determined based on the priority of the second logical channel.

9. The terminal of claim 7, wherein the first logical channel and the second logical channel have data to be transmitted.

10. A base station in a wireless communication system, the base station comprising:

a transceiver; and a processor configured to:

transmit, via the transceiver to a terminal, through radio resource control (RRC) signaling, information for configuring a first configured grant (CG) and a second CG, and configuration information including information on a first logical channel and information on a second logical channel, wherein the information on the first logical channel includes information on a priority of the first logical channel and first information indicating that the first CG is allowed for the first logical channel, and the information on the second logical channel includes information on a priority of the second logical channel and second information indicating that the second CG is allowed for the second logical channel, and receive, via the transceiver from the terminal, data based on the first CG, in case that resources of the first CG and the second CG are overlapped, and the priority of the first logical channel is higher than the priority of the second logical channel, wherein data from the first logical channel is mapped to the first CG based on the first information and data from the second logical channel is mapped to the second CG based on the second information, and wherein, in case that the information on the first logical channel does not include third information indicating that the second CG is allowed for the first logical channel, the data from the first logical channel is not mapped to the second CG.

11. The base station of claim 10, wherein a priority for the first CG is based on the priority of the first logical channel, and wherein a priority for the second CG is based on the priority of the second logical channel.

12. The base station of claim 10, wherein the first logical channel and the second logical channel have data to be transmitted.

* * * * *